US008526735B2

(12) United States Patent
Inagaki

(10) Patent No.: US 8,526,735 B2
(45) Date of Patent: Sep. 3, 2013

(54) TIME-SERIES ANALYSIS OF KEYWORDS

(75) Inventor: Takeshi Inagaki, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/461,856

(22) Filed: May 2, 2012

(65) Prior Publication Data

US 2012/0215523 A1    Aug. 23, 2012

Related U.S. Application Data

(63) Continuation of application No. 12/983,047, filed on Dec. 31, 2010.

(30) Foreign Application Priority Data

Jan. 8, 2010 (JP) ...................................... 2010-2852

(51) Int. Cl.
*G06K 9/34* (2006.01)
(52) U.S. Cl.
USPC ............................. 382/173; 382/177; 382/190
(58) Field of Classification Search
USPC ................. 382/173, 177, 190; 1/1; 707/767, 707/765, 776, 602, 999.005, E17.09, 999.003; 704/1, 9; 715/255
See application file for complete search history.

(56) References Cited

U.S. PATENT DOCUMENTS

| 6,638,317 | B2 * | 10/2003 | Nakao | ............................ | 715/255 |
| 6,671,683 | B2 | 12/2003 | Kanno | | |
| 6,963,830 | B1 * | 11/2005 | Nakao | ................................ | 704/1 |
| 7,715,631 | B2 | 5/2010 | Tanaka et al. | | |
| 7,734,641 | B2 | 6/2010 | Kanigsberg et al. | | |
| 7,831,610 | B2 | 11/2010 | Takata et al. | | |

FOREIGN PATENT DOCUMENTS

| JP | 6274193 A | 9/1994 |
| JP | 10154150 A | 6/1998 |
| JP | 2000172701 A | 6/2000 |
| JP | 2000250822 A | 9/2000 |

(Continued)

OTHER PUBLICATIONS

Office Action dated Sep. 26, 2012 for U.S. Appl. No. 12/983,047, Takeshi Inagaki, filed Dec. 31, 2010.

(Continued)

*Primary Examiner* — Anh Do
(74) *Attorney, Agent, or Firm* — Thomas E. Lees, LLC

(57) ABSTRACT

Processing for a time-series analysis of keywords comprises clustering or classifying pieces of document data, each of which is description of a phenomenon in a natural language, on the basis of frequencies of occurrence of keywords in the pieces of document data, individual keywords being also clustered or classified by clustering or classifying the pieces of document data, and performing a time-series analysis of frequencies of occurrence of pieces of document data containing individual keywords in clusters or classes into which the pieces of document data are clustered or classified or a time-series analysis of frequencies of occurrence of pieces of document data containing clusters or classes into which the individual keywords are clustered or classified. Frequency distribution showing variation of the frequencies of occurrence of the pieces of document data is acquired by the time-series analysis.

12 Claims, 19 Drawing Sheets

(56) References Cited

FOREIGN PATENT DOCUMENTS

| | | |
|---|---|---|
| JP | 2001117930 A | 4/2001 |
| JP | 2005092491 A | 4/2005 |
| JP | 2006510114 A | 3/2006 |
| JP | 2006099753 A | 4/2006 |
| JP | 2009301221 A | 12/2009 |
| WO | 2004055639 | 7/2004 |

OTHER PUBLICATIONS

Michail Vlachos et al., "On Periodicity Detection and Structural Periodic Similarity", Proceedings of the fifth SIAM International Conference on Data Mining, USA, Society for Industrial and Applied Mathematics, Apr. 23, 2005, pp. 449-460, URL, http://www.siam.org/proceedings/datamining/2005/dm05_40vlachosM.pdf.

* cited by examiner

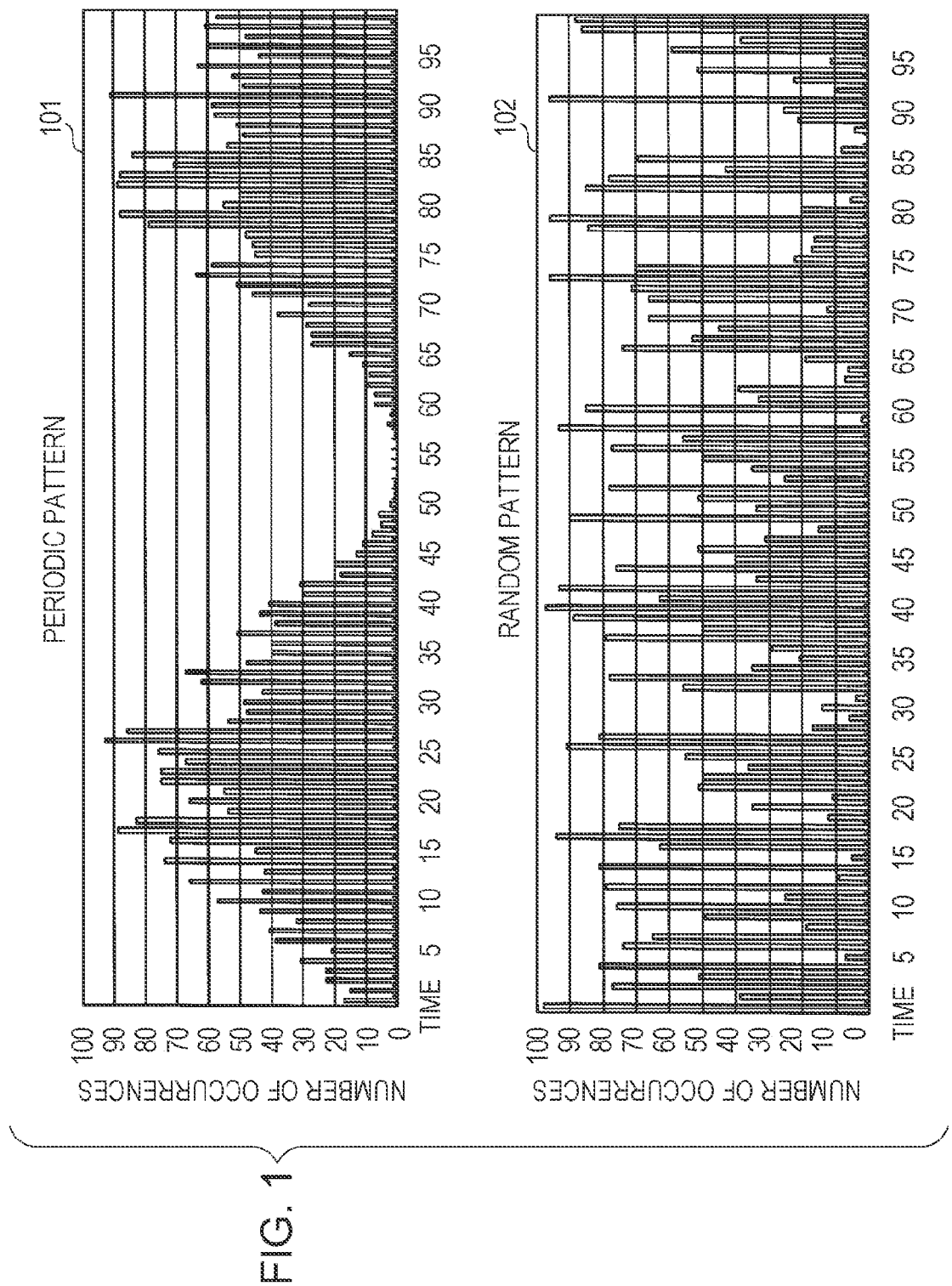

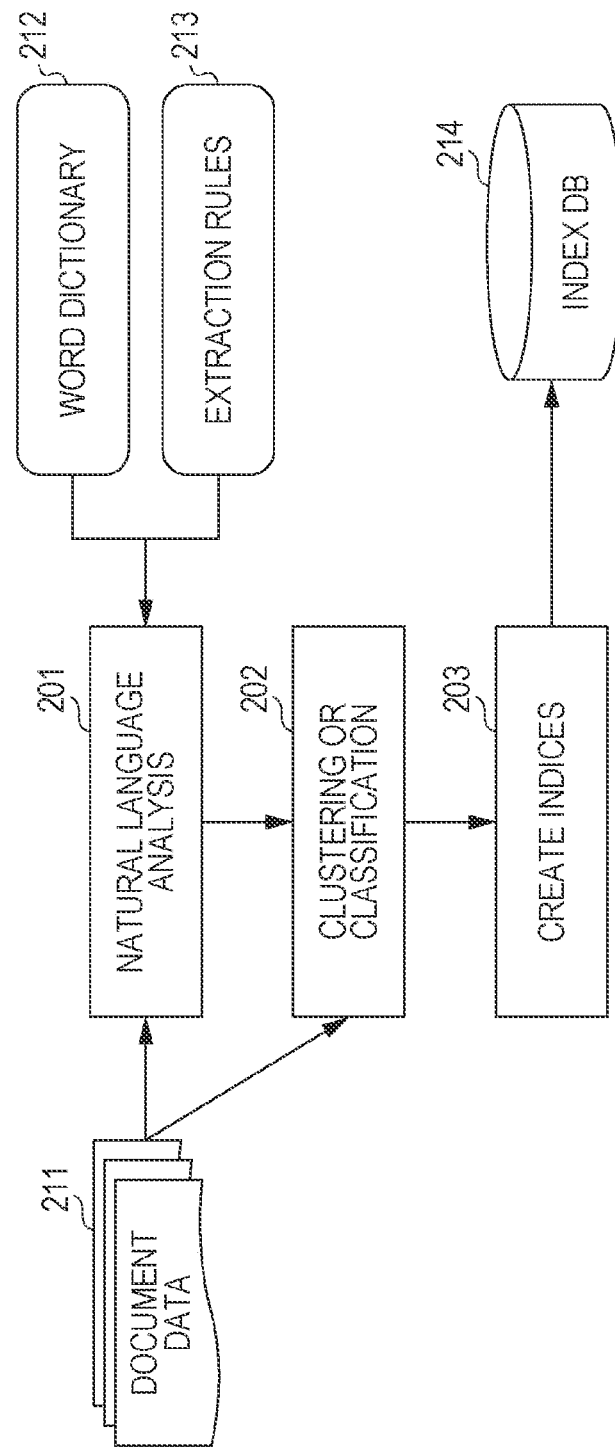

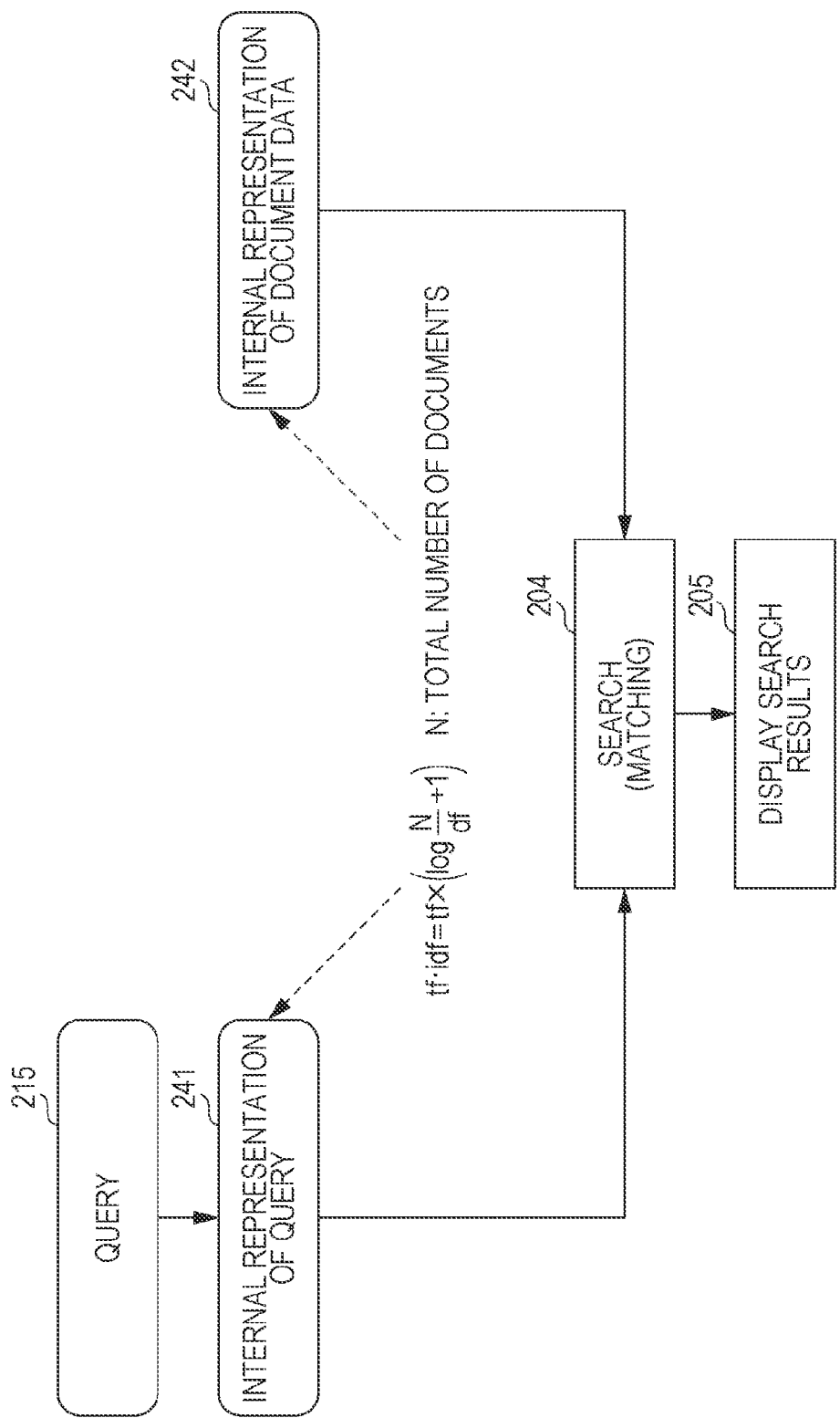

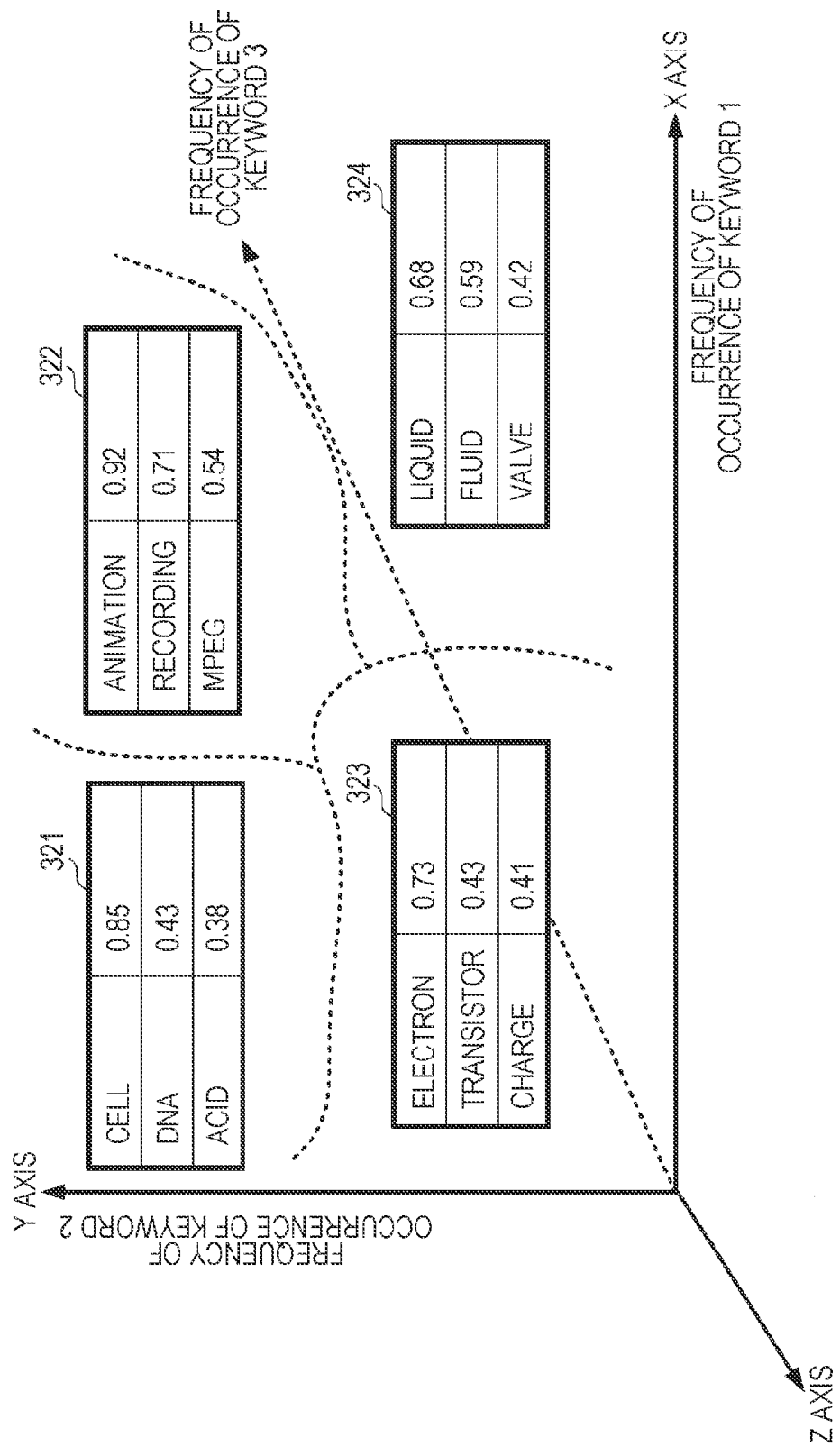

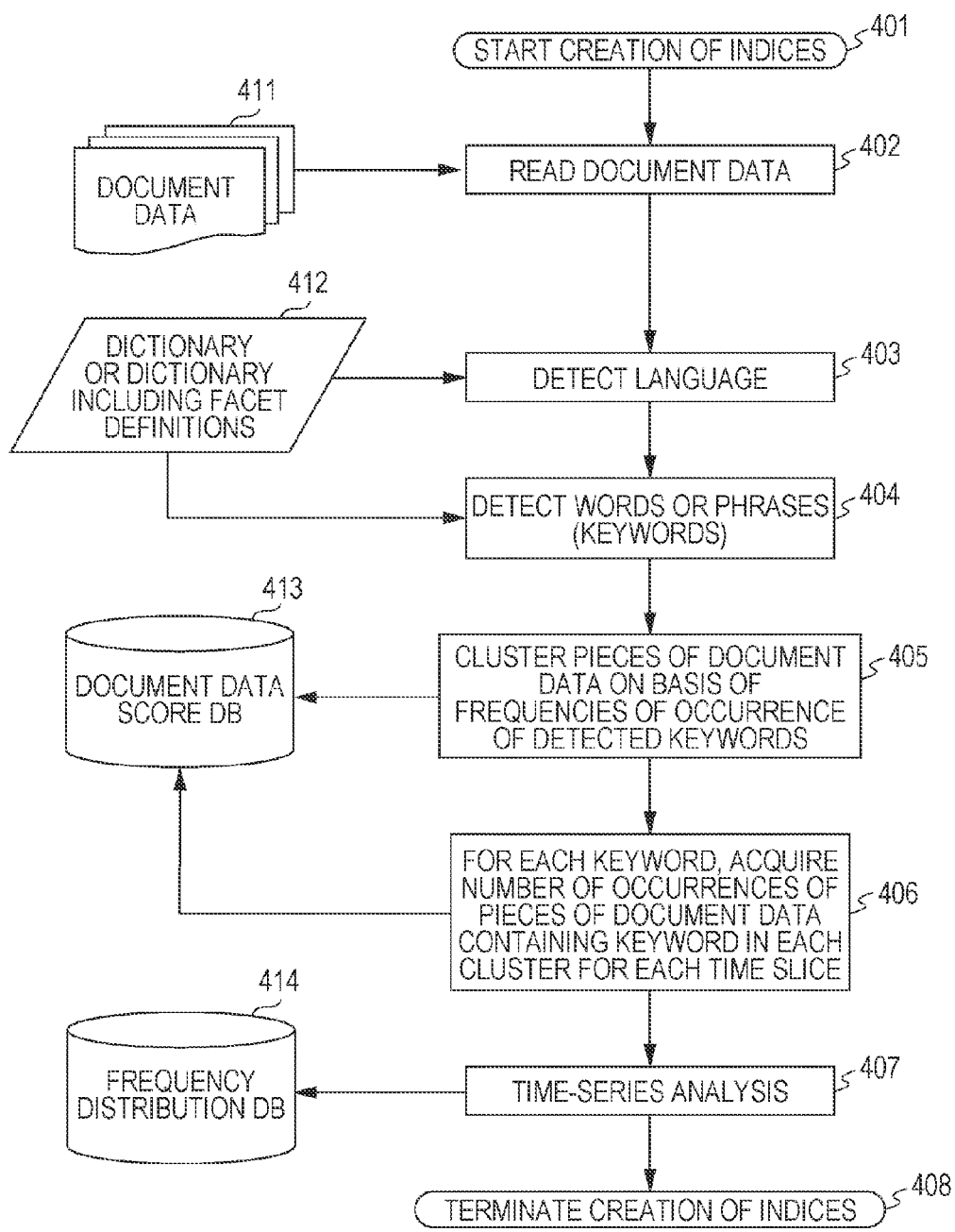

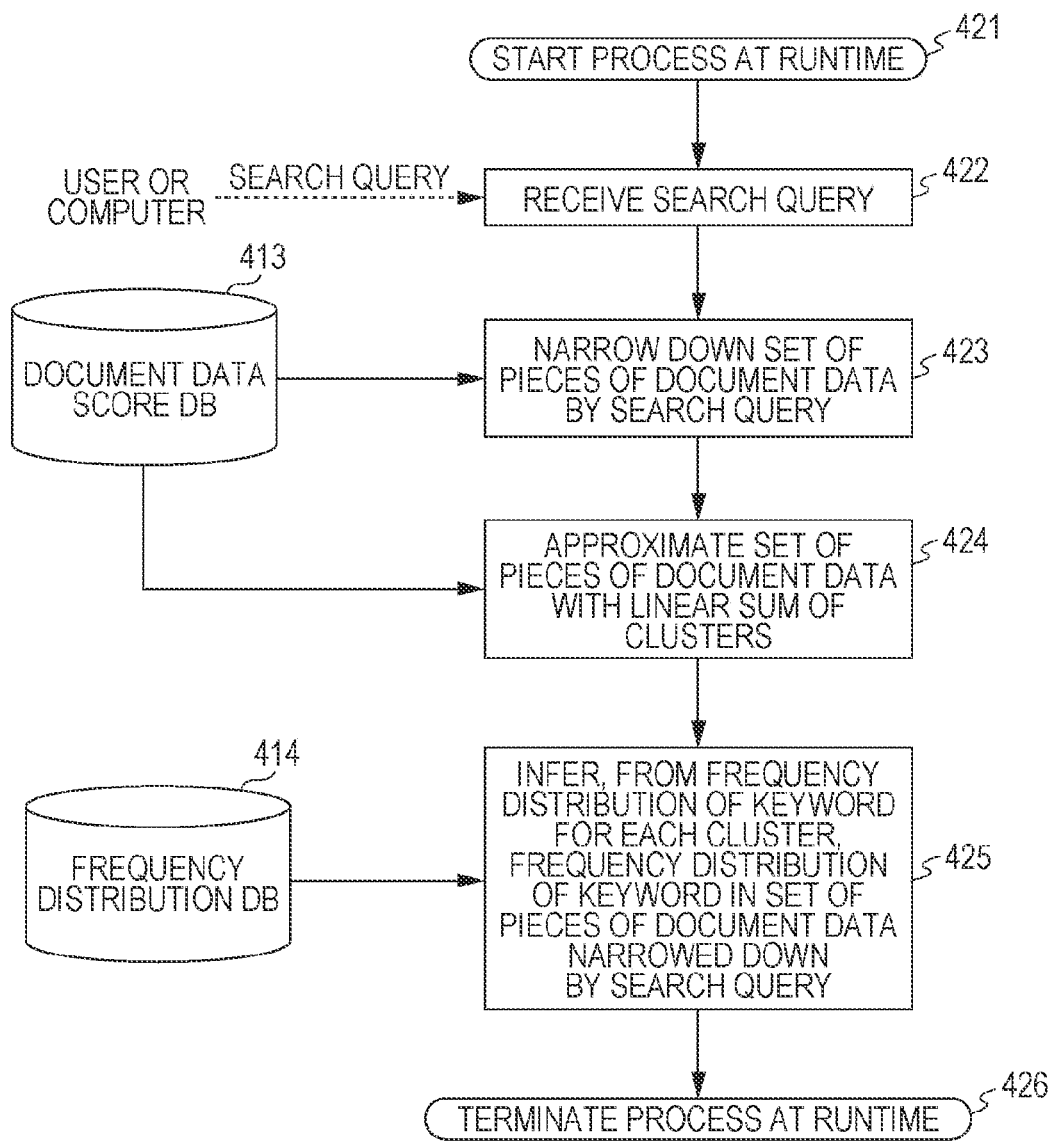

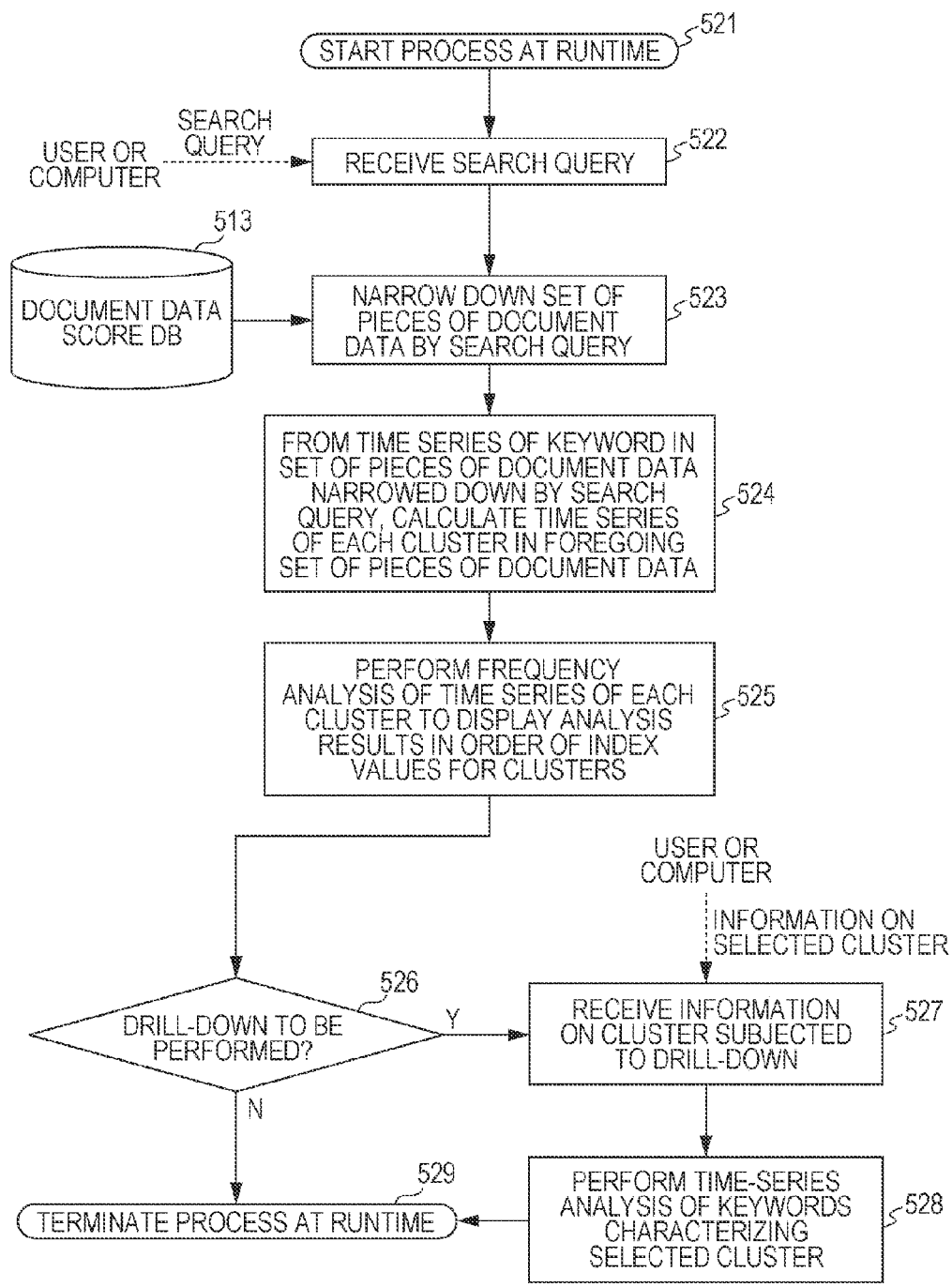

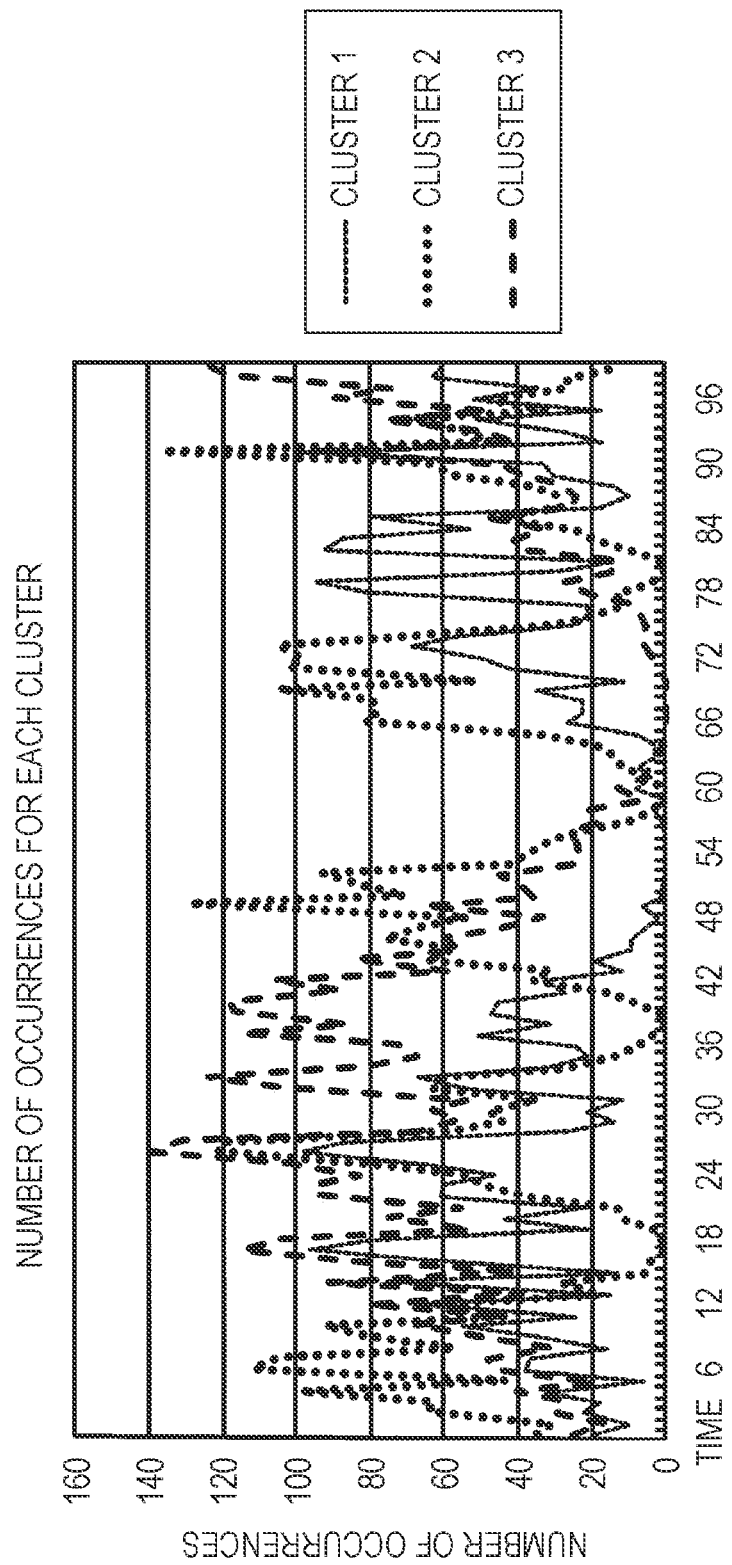

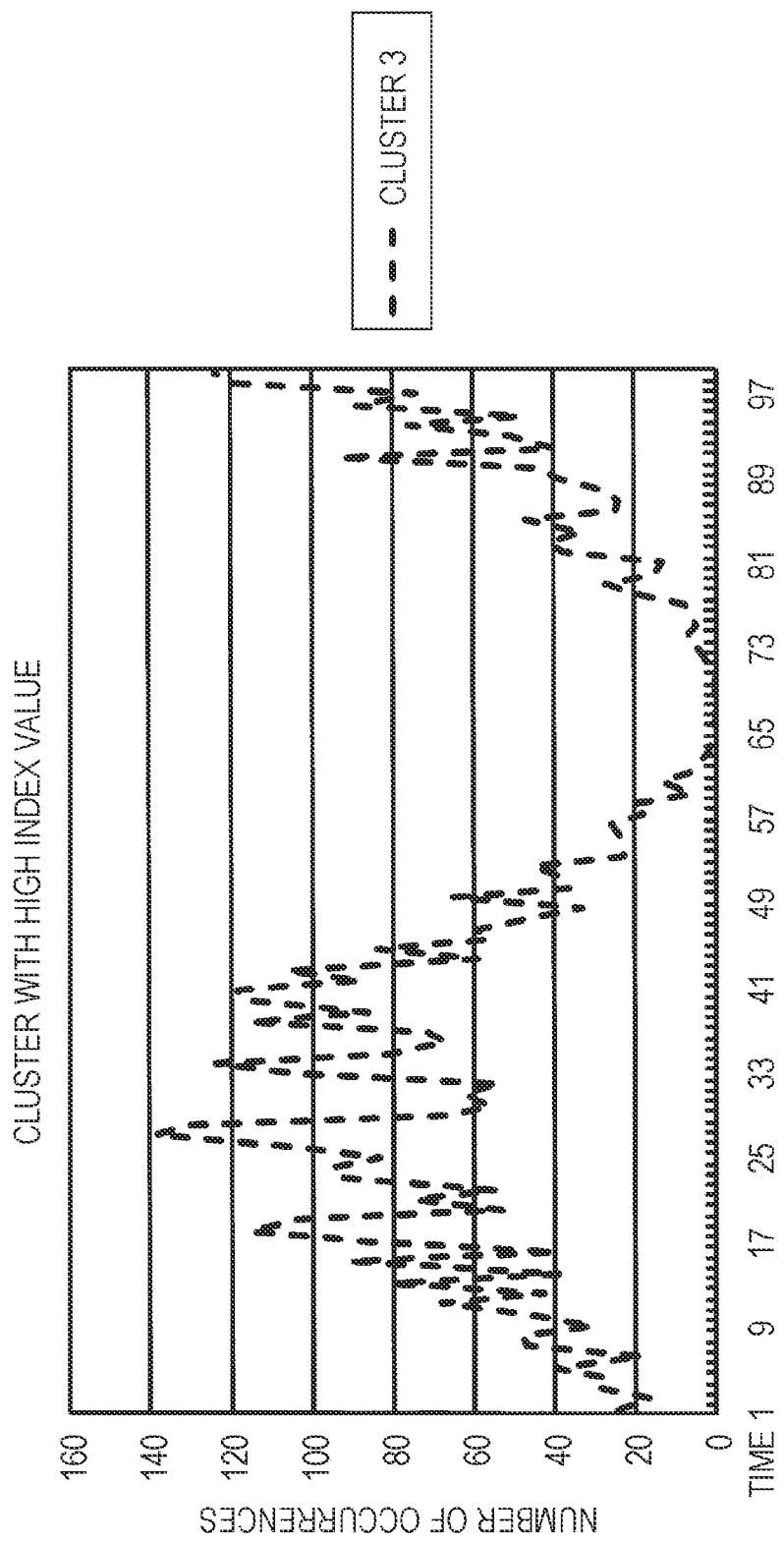

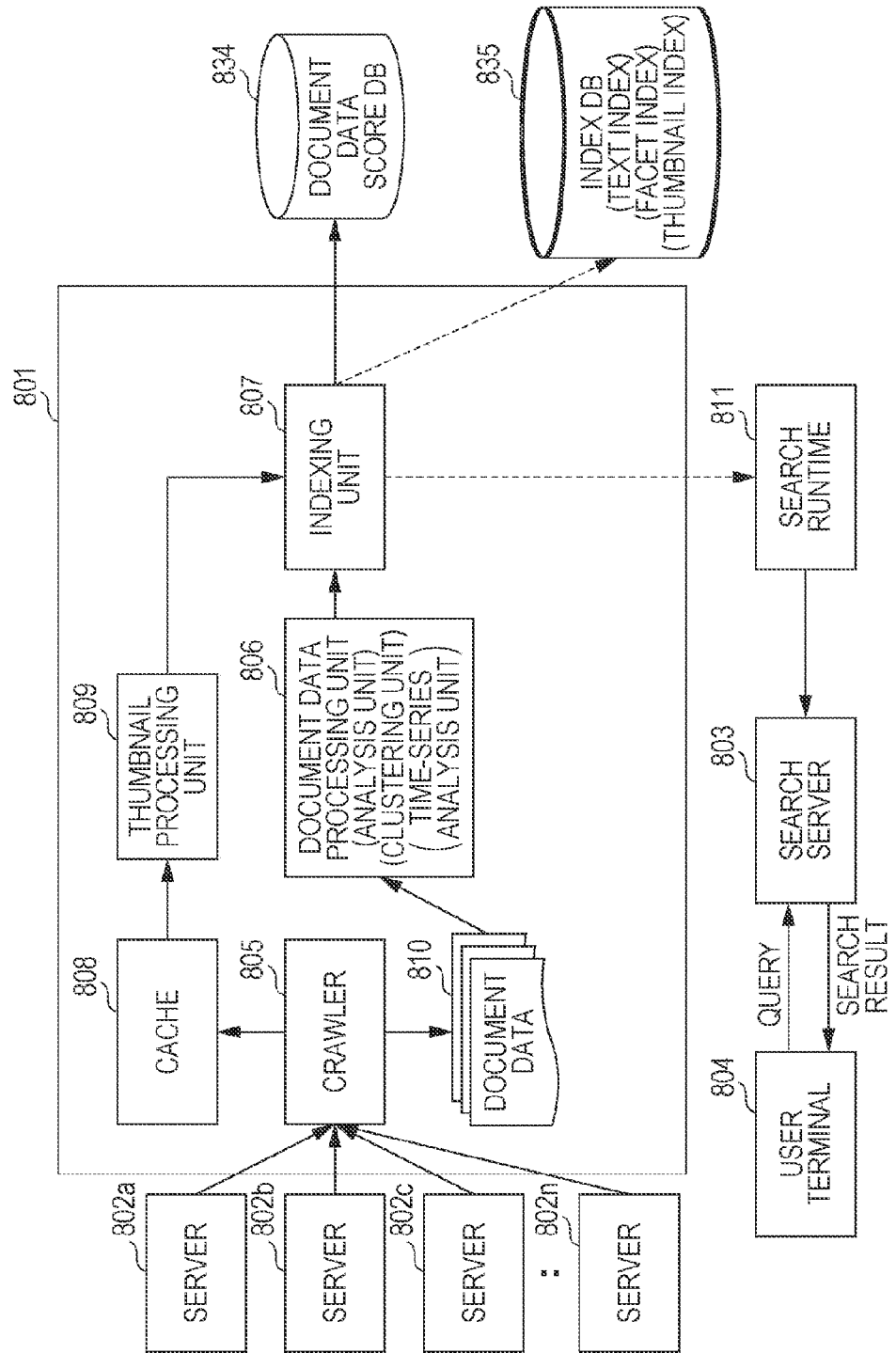

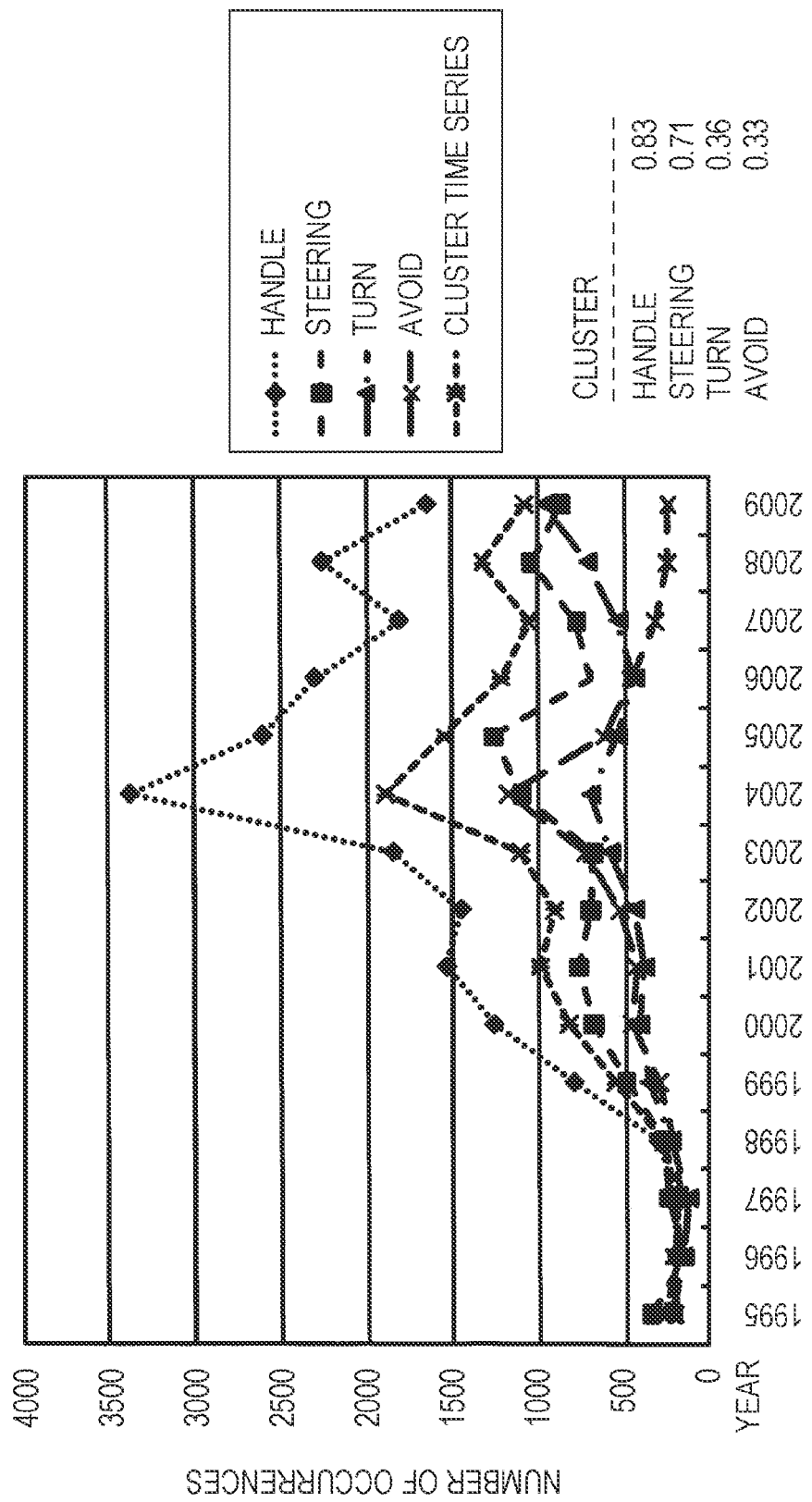

TIME-SERIES ANALYSIS OF KEYWORDS

CROSS-REFERENCE TO RELATED APPLICATIONS

This application is a continuation of U.S. patent application Ser. No. 12/983,047, filed Dec. 31, 2010, entitled "TIME-SERIES ANALYSIS OF KEYWORDS", now which claims priority to Japanese Patent Application No. 2010-2852, filed Jan. 8, 2010, the disclosures of which are incorporated herein by reference.

BACKGROUND

The present invention relates to a processing method, a processing system, and a computer program for a time-series analysis of keywords.

As computer networks have spread and the performance of computer systems has been improved, access to a huge amount of electronic document data (hereinafter called document data) has been facilitated. In this regard, a document data search enables the location of necessary document data in a huge amount of document data. Moreover, a document data search can be performed on various types of objects. For example, in the case of search engines in Internet browsers, document data (for example, web pages) on the Internet can be searched. As another example, in companies, document data (for example, reports and web pages) on intranets can be searched to accumulate results of searched document data in business operations.

One web search service usable on the Internet or intranets, can check the trend of a specific search keyword. Correspondingly, trends in searches can be determined by checking trends in search keywords. In a service for checking trends, search keywords that are currently searched for many times are displayed in a ranking. Moreover, in the service, clicking a search result causes a jump to, for example, a detailed page showing the results of news, a blog, a web search, etc., which is related to a corresponding search keyword or fluctuations in the number of searches over time.

A method for finding trends in search keywords includes performing a text analysis of document data, displaying the frequencies of occurrence of search keywords on the time series, and detecting a point where the range of fluctuation sharply changes. In general, in a text analysis, a rather long time is necessary to create indices which are acceptable. For example, one month may be spent to create indices. On the other hand, when a search of web pages or an analysis of trends is performed, a rather quick response is required. For example, in an interactive operation, the response is required to be returned within a few seconds, at least several tens of seconds.

BRIEF SUMMARY

According to aspects of the present invention, processing a time-series analysis of keywords comprises segmenting, by performing at least one of clustering and classifying, pieces of document data based at least in part on frequencies of occurrence of keywords in the pieces of document data, wherein the pieces of document data include a description in a natural language, the segmenting resulting in creating at least one document cluster and at least one keyword cluster. Time series analysis is further performed by acquiring a frequency distribution showing variation of the frequencies of occurrence of the pieces of document data by performing at least one of: a time-series analysis of frequencies of occurrence of pieces of document data containing individual keywords in at least one document cluster, and a time-series analysis of frequencies of occurrence of pieces of document data containing at least one keyword cluster.

BRIEF DESCRIPTION OF THE SEVERAL VIEWS OF THE DRAWINGS

FIG. 1 shows a periodic pattern and a random pattern in the timeline of the number of occurrences of a keyword;

FIG. 2A shows the flow of creation of an index database, including clustering or classification of document data;

FIG. 2D shows an exemplary search by matching the internal representation of document data with the internal representation of a query;

FIG. 3C shows a conceptual diagram of a third aspect of clustering of a plurality of pieces of document data;

FIG. 4A shows the flow of creating indices according to an embodiment of the present invention;

FIG. 4B shows the flow of performing a runtime process using frequency distribution created in FIG. 4A;

FIG. 5B shows the flow of performing a runtime process using document data scores created in FIG. 5A;

FIG. 7A shows the number of occurrences of a keyword for each cluster over time;

FIG. 7B shows the result of selecting a cluster having a high index value from clusters 1 to 3 shown in FIG. 7A;

FIG. 8A shows a system diagram of a computer according to an embodiment of the present invention, the computer including a document data processing unit and an indexing unit;

FIG. 10 shows search results according to an embodiment of the present invention.

DETAILED DESCRIPTION

Figure 2B:
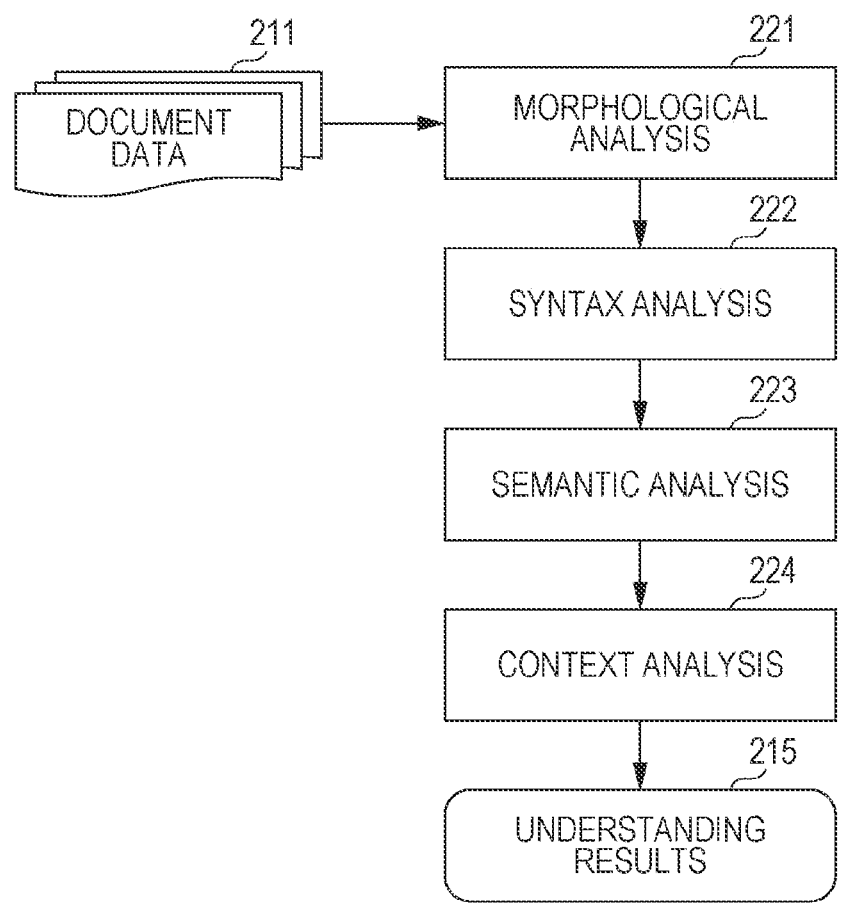
FIG. 2B shows the flow of the outline of a natural language analysis.

As used herein, "document data" represents a description of an event, which is typically expressed in a natural language. Moreover, document data is prepared in an electronic format and is machine readable. For example, document data may represent an event described in a document in an electronic format, where the described event occurred in the real world. Document data may include a text segment. Moreover, document data may be a set of data that can be identified by a subject as a key. Document data may comprise, but is not limited to, a Web page on the Internet, a product incident report, a telephone reception report, a piece of news, a technical document in a company, etc.

A piece of document data need not correspond to a single physical data file. For instance, a piece of document data may be an entire data file or just a portion of the data file. Thus, a single data file may include a set of pieces of document data. Document data may be stored as a data file in a document database including, but not limited to: a storage unit in a server, a network storage unit connected via a network, or a storage area network (SAN). The storage format is not limited to a specific type of format. Rather, document data may be described in any number of formats, examples of which include plain text, HTML, or XML. Pieces of document data are periodically or intensively collected by, for example, a crawler (805 in FIG. 8A) from various servers, as will be described in greater detail herein.

As used herein, a "set of pieces of document data" represents a data set including one or more pieces of document data. Further, a set of pieces of document data may be physically a part, or all, of one or more data files.

As used herein, a "keyword" represents at least one word, at least one phrase, or a combination thereof, which is identified for a document data search. A word represents a minimum language unit having speech sound, meaning, and a grammatical function and may be any part of speech. In general, a phrase represents two or more words that are grammatically disposed and functions as a unit in a sentence. In particular, in English, a phrase represents a series of two or more words functioning as a single part of speech, but is not a complete sentence. For instance, a phrase may not include a finite verb and the subject, but includes a component functioning as a single part of speech.

As used herein, "clustering" can occur on pieces of document data or on keywords. As it relates to pieces of document data, "clustering" means segmenting pieces of document data into groups on the basis of the similarity between pieces of document data. In one aspect, the similarity is based on the co-occurrence relationship between keywords contained in the pieces of document data. In another aspect, the similarity is based on the distance between pieces of document data in a case when the pieces of document data are mapped to a space where keywords are set as the dimensions. Moreover as it relates to keywords, "clustering" means segmenting keywords into groups on the basis of the similarity between keywords. In one aspect, the similarity is based on the co-occurrence relationship between the keywords in pieces of document data. In another aspect, the similarity is based upon the distance between keywords in a case where the keywords are mapped to a space in which pieces of document data are set as the dimensions.

As used herein, a "cluster" may also represent a group generated by clustering pieces of document data or set of pieces of document data. Since document data may be a set of keywords, clustering a set of pieces of document data may comprise clustering keywords. A cluster is also a concept composed of keywords correlating with each other in a co-occurrence relationship in document data.

Document data that a user needs can be extracted by searching such a set of grouped pieces of document data more efficiently than by searching pieces of document data one-by-one. Each cluster may include not only a specific keyword but a set of typical keywords. In general, in each cluster, a set of scored words or phrases is defined, which characterizes the cluster. This clustering and scoring is described in greater detail with reference to FIGS. 2A-D.

A real number is determined, which represents the similarity between pieces of document data. As an example, a real number may be determined, which represents the similarity between two pieces of document data. Moreover, it may be assumed for instance, that the larger the value of the real number is, the more similar two pieces of document data are. In clustering of document data, a similarity may be acquired on the basis of, for example, a keyword that is common among pieces of document data. A cluster can be created by grouping highly similar pieces of document data.

The distance between pieces of document data represents the distance between two pieces of document data in Euclidean space. In the space, each word is set as each dimension, as described in greater detail with reference to FIG. 2A. A piece of document data is plotted as either the number of words occurring in the piece of document data or a point the coordinates of which are tf•idf (term frequency—inverse document frequency). Term frequency (tf) and inverse document frequency (idf) will be described in greater detail below.

The distance between two pieces of document data is calculated as the distance between corresponding two points in the Euclidean space. A cluster can be created by grouping pieces of document data, the distance between which is short. The aforementioned tf•idf is a frequency (tf) of occurrence of a word in document data multiplied by the inverse or the inverse of logarithm of the number of pieces of document data containing the word so as to reduce the contribution from frequent words. An example formula comprising tf is set out in equation 2, below. An example formula comprising idf is set out in equation 3, below.

One definition of the similarity between pieces of document data is the inverse of a distance. However, a similarity need not be defined as a distance in the Euclidean space as long as the size relationship is maintained. For example, a similarity may be also defined as the central angle of two points on a spherical surface. Thus, a similarity may be implemented in various forms.

Clustering of documents using a similarity or a distance includes four major analyses, including morphological analysis, expression of the document data in space, defining the similarity between pieces of document data, and clustering.

Morphological Analysis:

An analysis unit (806 in FIG. 8A) performs a morphological analysis on document data to segment the document data into keywords. Morphological analysis techniques include a morphological analysis according to rules and a technique in which a probabilistic language model is used. An example of a morphological analysis according to a probabilistic language model includes, but is not limited to, a hidden Markov model. Any available morphological analysis engine may be used to perform this analysis. In clustering of document data, in many cases, a vector including the respective weights of keywords constituting a document is used to express document data. In document data, keywords need to be separated from each other to express such a vector. For the separation, in the case of document data in, for example, Japanese, Chinese, and Korean, the aforementioned morphological analysis is performed. For example, in the case of document data in English, since a separator (space) exists between words, segmenting a sentence into morphemes is relatively simple as compared with segmentation of document data in Japanese. However, in a language such as English, it is necessary to determine the part of speech (e.g., noun, verb, adjective, etc.) of a morpheme or a compound word.

Expression of the Document Data in Space:

A clustering unit (806 in FIG. 8A) expresses document data as the aforementioned vector including the respective weight of words. An attribute value $d_i^k$ (k=1, 2, ..., n) of a document vector $d_i$ in document data $D_i$ is acquired according to equation 1 described below. In equation 1, a tf•idf value in the document data $D_i$ shown in equations 2 and 3 described below is used. The value of tf•idf is acquired on the basis of two indices: tf (the frequency of occurrence of a word) and idf (the inverse frequency of occurrence).

[E1]

$$d_i^k = tf_i(\lambda^k) \sim idf(\lambda^k) \quad \text{Equation 1}$$

Equation 2

$$tf_i(\lambda^k) = \frac{\text{Frequency of occurrence of keyword } \lambda^k \text{ in } D_i}{\text{Total sum of respective frequencies of occurrence of all keywords in } D_i} \quad [E2]$$

Equation 3

$$idf(\lambda^k) = \log \frac{\text{Total number of pieces of document data}}{\text{Number of pieces of document data in which keyword } \lambda^k \text{ occurs}} + 1 \quad [E3]$$

In this case, each vector is normalized so that the length of $d_i$ is one.

Vectors are expressed in a vector space model. A vector space model is a search model in which document data is expressed using vectors.

Defining the Similarity Between Pieces of Document Data:

The clustering unit defines the similarity or distance between pieces of document data. As noted above, for clustering of document data, a similarity or a distance may be defined as an index indicating the degree of similarity between pieces of document data. The technique for deriving a degree of similarity between pieces of document data varies with document data subjected to clustering. Techniques for acquiring a similarity or a distance include hierarchical clustering, non-hierarchical clustering (k-means), dimensionality reduction such as a principal component analysis, a technique according to a probability model, and a technique according to the graph theory. In embodiments described herein, the technique for acquiring a similarity or a distance may be appropriately selected in a manner that depends on document data subjected to clustering but is not limited to the techniques described above.

It is assumed that the respective document vectors of the document data $D_i$ and document data $D_j$ are $d_i$ and $d_j$. A similarity s $(d_i,d_j)$ between the pieces of document data may be expressed by the cosine of an angle formed between $d_i$ and $d_j$, as shown in equation 4 described below.

Equation 4

$$s(d_i, d_j) = \frac{d_i + d_j}{|d_i||d_j|} \quad [E4]$$

Clustering:

The clustering unit performs clustering using the aforementioned similarity.

Hierarchical Clustering:

In hierarchical clustering described above, for example, a cluster can be created according to the following algorithm using a similarity acquired in equation 4 described above.

The clustering unit sets each piece of document data as a cluster. Further, the clustering unit obtains a pair of clusters, the similarity between which is largest from a set of clusters, and compares the similarity between the pair of clusters and a threshold. If the similarity is more than the threshold (alternatively, equal to or more than the threshold), then the clustering unit combines the two clusters and selects two new clusters whose similarity is the largest. The process of obtaining a pair of clusters and comparing the similarity between the clusters to the threshold repeats until the similarity between the two selected clusters is equal to or less than the threshold (alternatively, less than the threshold). At that point, the clustering unit terminates clustering.

By means of example and not limitation, the similarity between a pair of clusters may be acquired according to the furthest neighbor technique shown in equation 5 described below. In the furthest neighbor technique, the minimum similarity, out of the similarities between a document vector x of document data belonging to a cluster $G_i$ and a document vector y of document data belonging to a cluster $G_j$, is set as the similarity between the clusters $G_i$ and $G_j$.

Equation 5

$$s(G_i, G_j) = \min_{x \in G_i, y \in G_j} s(x, y) \quad [E5]$$

Non-Hierarchical Clustering:

In non-hierarchical clustering described above, for example, the k-means technique can be used to create a cluster according to the following algorithm.

It is assumed that the number of segmented clusters is k, the number of pieces of document data is m, and the number of pieces of document data included in a cluster W is N(W).

The clustering unit sets k initial clusters in a predetermined manner. The clustering unit further calculates, according to equation 6 described below, an increase e(i,W) in an error if the document data Di would be moved to the cluster W and moves the document data $D_i$ to the cluster W having the smallest value.

Equation 6

$$e(i, w) = \frac{N(W)D(i, W)^2}{N(W) + 1} - \frac{N\{W(i)\}D\{i, W(i)\}^2}{N\{W(i)\} - 1} \quad [E6]$$

In this case, D(i,W) is the distance between the document data $D_i$ and the cluster W and is defined by the following equations 7 and 8.

Equation 7

$$D(i, W) = \sum_{k=1}^{n} \{d_i^k - f_w^k\} \quad [E7]$$

Equation 8

$$f_w^k = \frac{\sum_{x \in L_i} d_x^k}{N(W)} \quad [E8]$$

When a document has been moved, the clustering unit finds another cluster to move and calculates the error if the document was moved as described above and repeats until a document is not moved. When no document data has been moved from one cluster to another cluster, the clustering unit terminates the process.

Dimensionality Reduction:

Dimensionality reduction described above includes, but is not limited to, the Latent Semantic Analytics (LSA) also called the Latent Semantic Indexing (LSI). In the LSA, a document-word matrix representing the frequency of occurrence of a keyword in each piece of document data is used. A sparse matrix is used as a document-word matrix. In a document-word matrix, a column corresponds to a word or a phrase, and a row corresponds to document data. For example, tf•idf, described above, may be used as the weight of each element in the matrix. The LSA converts the sparse matrix to the relationships between words or phrase and some concepts and the relationships between pieces of document data. In this arrangement, a keyword is associated indirectly with document data via concepts.

Probability Model and Graph Theory:

Moreover, clustering can be performed without expressing document data as a vector. For example, the similarity between pieces of document data can be acquired by measuring, for example, the number of co-citations or bibliographic coupling. When the similarity can be defined, clustering can be performed according to an appropriate clustering technique.

As mentioned above, document data can be segmented by clustering. Further, document data can be segmented by classification. "Classification" can represent segmenting pieces of document data into groups automatically by a computer, or segmenting pieces of document data into groups can be performed manually. A group generated by classifying a set of pieces of document data or a group for classifying a set of pieces of document data may be called a class.

Classification is performed according to, for example, a model expressed by equations, a model expressed by rules, a model expressed by probabilities, and a model for performing matching. The model expressed by equations is, for example, a discriminant analysis. The model expressed by rules is, for example, a rule base or a decision tree. The model expressed by probabilities is, for example, a Bayesian network. The model for performing matching is, for example, self-organizing maps.

Classification is different from clustering for example, in that clustering creates groups relative to each other without defining a class in advance, while classification defines a class then creates groups. More particularly, clustering of document data belongs to unsupervised learning in which a class is defined from keywords in prepared pieces of document data, with no class (also called label) being given to each piece of document data subjected to processing. That is, clustering is performed by, instead of defining a class in advance, defining a data space and performing grouping on the basis of the similarity or distance between existing pieces of document data. On the other hand, "classification" of document data belongs to supervised learning in which a class is given to each piece of document data subjected to processing. In classification, a keyword (a target variable and a supervisory signal) in document data is noted. Both clustering and classifying are types of segmenting pieces of document data. Further, both a cluster and a class are types groups.

According to certain aspects herein, a score at which or the probability that a piece of document data belongs to a cluster or a class, represents the probability that, when a certain piece of document data is specified, the piece of document data belongs to a cluster or a class. In this regard, the probability may be calculated on the basis of words contained in the piece of document data. The probability can be statistically acquired from the frequency of occurrence of words in a group of documents having been already determined as belonging to a cluster or a class. The probability is indicated in a range of 0 to 100%. A score is indicated as, for example, the number of marks.

In embodiments described herein, a "document cluster" represents a cluster or class into which pieces of document data are clustered or classified (e.g., grouped). The frequency of occurrence of pieces of document data containing each keyword in a document cluster represents the number of pieces of document data in a document cluster containing each keyword extracted from pieces of document data.

In embodiments described herein, a "keyword cluster" represents a cluster or class into which keywords are clustered or classified. The frequency of occurrence of pieces of document data containing a keyword cluster represents the number of pieces of document data containing keywords belonging to a clustered or classified keyword cluster.

In embodiments described herein, a "time series" represents a series of observed values ordered in chronological order in a case where the observed values are successively acquired over time. In embodiments described herein, an observed value may be, for example, the frequency of occurrence of document data containing each keyword in a document cluster or the frequency of occurrence of document data containing a keyword cluster at predetermined sampling intervals. The sampling interval is appropriately set in a manner that depends on the characteristics of original data. The sampling interval needs to be set with an appropriate resolution so that changes in observed values can be detected. Moreover, when a plurality of observed values is obtained in a sampling interval, the observed values are collected as the total or average in the interval so that unexpected fluctuations resulting in noise are smoothed. Examples of sampling intervals include, but are not limited to: one year, one month, one week, one day, four hours, or five minutes.

In embodiments described herein, a "time-series analysis" includes an analysis in a frequency domain (i.e., spectral analysis or spectral decomposition). Techniques for a time-series analysis in a frequency domain include, for example, the Fourier transform and the wavelet transform.

In embodiments described herein, the "Fourier transform" represents a technique for expanding a time-series signal in a Fourier series and expressing, as a spectrum, the degree of contribution from each frequency component. Algorithms of the Fourier transform for a discrete time-series (discrete Fourier transform) include, for example, the fast Fourier transform. In embodiments described herein, any Fourier transform algorithm may be used.

In embodiments described herein, the "wavelet transform" basically represents a technique for a frequency analysis for expressing input waveforms by summing small waves (wavelets) by scaling and translating. In the mother wavelet transform, a wavelet coefficient is used as a basis function. Examples of a basis function include, although are not limited to: the Morlet function, the Gabor function, and the Mexican hat (Ricker) function. Scaling represents expanding and contracting a mother wavelet. The period (inverse of frequency) can be changed by scaling. Translating represents moving the center position of a mother wavelet laterally along the time axis. A similar waveform at a predetermined time can be extracted by translating. In the wavelet transform, a waveform similar to a mother wavelet at a predetermined time can be found by using operations of scaling and translating in combination.

Unlike the Fourier transform, in the wavelet transform, information in the time domain that is lost when the frequency characteristics are acquired can remain. In the wavelet transform, since scaling of a basis function is performed, an analysis of a broad frequency domain can be performed.

The wavelet transform is expressed by, for example, equation 9 described below.

Equation 9

$$x(t) = \sum_{m,n} a_{m,n} \phi_{m,n}(t) \quad [E9]$$

x(t) is a time-series function.
m is the wavelength.
n is the coordinates of the center of a wavelet.
$a_{m,n}$ is a real coefficient of each wavelet component.
$\phi_{m,n}$ is a wavelet function.
t is time.

In embodiments described herein, "frequency distribution" represents a distribution graph of the coefficient $a_{m,n}$ for each frequency acquired by the aforementioned time-series analysis. Frequency distribution is also called spectral decomposition.

Embodiments will now be described according to the drawings. It should be understood that the embodiments describe preferred aspects of the present invention, and there is no intention of limiting the scope of the present invention to content described here. The same reference numerals denote the same objects throughout the drawings unless otherwise specified.

Referring now to the drawings, FIG. 1 shows a periodic pattern and a random pattern in a timeline of an exemplary number of occurrences of an exemplary keyword.

A typical technique for a document data analysis is a scenario in which the frequency of occurrence of a keyword is analyzed on the time series, and a phenomenon occurring in the background is detected.

A graph 101 at the top shows the periodic pattern. The periodic pattern is exemplary of general trends.

A graph 102 at the bottom shows the random pattern. In the random pattern, no general periodic pattern is observed, and the trends are local ones.

The ordinate of the graphs 101, 102 described above represents the number of occurrences. The number of occurrences is the same as the frequency of occurrence. The abscissa of the same graphs 101, 102 represents the time axis and the time series of the number of occurrences.

The trends (also called fluctuations) are divided mainly into general trends 101 and local trends 102 by analyzing the frequency of occurrence of a keyword on the time series, as shown in FIG. 1. In general trends, trends are concentrated to form a shape like a mountain on a certain timeline. For example, a general trend is demonstrated from approximately time 0 to approximately time 50 in graph 101. A technique for finding these trends includes measuring the range of fluctuation on the time series and detecting a point where the range of fluctuation sharply changes.

However, this technique cannot perform an analysis such that general trends are searched for prior to local trends. In this regard, a technique for decomposing a time series of the frequency of occurrence into frequency components using a time-series analysis (for example, the Fourier transform or the wavelet transform) may allow a search for a general trend before a local trend. To find the aforementioned general trends with priority, an index shown in equation 10 described below is defined by applying the aforementioned time-series analysis to counting of the frequency of occurrence of documents containing a keyword (also called facet counting).

Equation 10

$$s(x)^{-1} = \sum_{m,n} c_m a_{m,n}^2 \quad [E10]$$

$$c_1 < c_2 < c_3 < \ldots$$

$s(x)^{-1}$ is the inverse of an index for a time series x(t) of the frequency of occurrence of documents.
m is the wavelength.
n is the coordinates of the center of a wavelet.
$a_{m,n}$ is a real coefficient of each wavelet component and shows the result of a frequency analysis.
$c_1, c_2, c_3, \ldots$ are constants for weighting contributions from individual frequency components.

According to the definition of the aforementioned index, in a case where the wavelength is long, the fluctuations are large, and the number of frequency components is small, the value of the index is large. On the other hand, in the case of a short frequency or multiple frequencies, the value of the index will be smaller. The index is described in greater detail below in reference to FIG. 2C.

However, in practice, it requires a fairly long time to calculate, for all keywords, indices according to the definition of the aforementioned index.

FIG. 2A shows the flow of creation of an index database, including clustering or classification of document data.

To create an index database 214: words and phrases are extracted from pieces of document data 211 at 201, the pieces of document data are clustered or classified (i.e., segmented) at 202, and indices for determining pieces of document data containing search keywords using the search keywords are created at 203. Words or phrases are assigned to pieces of document data as indices. In this case, a score at which or the probability that document data belongs to a cluster or a class is added to the document data as metadata. Creation of an index database will now be described according to 201, 202 and 203 in FIG. 2A.

In 201, the analysis unit (806 in FIG. 8A) in a computer performs a natural language analysis on the prepared pieces of document data 211. The pieces of document data 211 are stored in, for example, a storage unit or another recording medium storing a document database. An example of a language analysis includes, but is not limited to, the following four analyses, as shown in FIG. 2B: a morphological analysis 221, a syntax analysis 222, a semantic analysis 223, and a context analysis 224. A natural language analysis may be performed using, for example, available natural language analysis application software. For example, a natural language analysis engine is implemented as a function of International Business Machines Corporation of Armonk N.Y. (IBM) (registered trademark of IBM Corporation) OmniFind (registered trademark of IBM Corporation) Enterprise Edition.

When pieces of document data have been inputted or acquired, the analysis unit uses a word dictionary 212 and specific rules 213 to extract words from the pieces of document data 211. The word dictionary (212) is a dictionary to be used to extract words from document data by a natural language analysis. For example, a dictionary for a field that is the same as or similar to the field of content of document data may be used as the word dictionary. The extraction rules 213 are rules or regulations to be used to extract words from document data by a natural language analysis. In a natural language analysis, part-of-speech information is added to the extracted words using the word dictionary 212. The analysis unit may further extract phrases on the basis of the words to which part-of-speech information is added and the extraction rules 213.

At 202, the clustering unit in the computer performs clustering or classification of the pieces of document data 211 stored in the document database. In clustering of pieces of document data, the pieces of document data are segmented into groups on the basis of the similarity or distance between the pieces of document data. In classification of pieces of document data, the pieces of document data are segmented into groups, either manually or automatically by a computer. In clustering or classification, the respective scores of clusters are acquired for each piece of document data. The technique for acquiring such scores varies with the algorithm of clustering or classification. As such, the aforementioned algorithm defines scores.

For example, as mentioned above, in a technique for performing mapping in a word space, in the word space, each cluster is defined as a point representing the cluster, and each piece of document data is defined as a point. In the case of this mapping technique, the inverse of the distance between points can be set as a score. Another technique is one for considering a point as a vector and performing definition using an inner product. Yet another technique is one for considering the frequency of occurrence of a word as a statistical probability, acquiring the probability according to Bayes' rule, and setting the probability as a score. Specific examples of clustering are described in greater detail below in reference to FIGS. 3A to 3C.

At 203, an indexing unit (807 in FIG. 8A) in the computer converts document data to be searched to a format that can be internally processed (internal representation). This internal representation may be called an index. The indexing unit stores, as indices, keywords extracted from the pieces of document data 211 in the index database 214. The indexing unit further creates a document list containing the respective scores of clusters for each piece of document data. The document list may be stored in the index database 214 or in a recording medium such as another database. When all the respective scores of clusters in each piece of document data are stored in a document list, the document list becomes redundant, resulting in a large amount of data. Thus, the respective scores of clusters that are higher than a predetermined threshold or the respective scores of clusters occupying a predetermined proportion may be stored in a document list, and the respective scores of the other clusters may be considered zero.

The index database 214 is created by repeating 201 to 203. Creation of the index database 214 enables search of document data using the index database 214 on the basis of a search keyword input by a user or created by a computer.

Indices can be automatically created by a computer in a manner that depends on an improvement in the efficiency of search or the purpose of search, as described above in 203. Alternatively, indices may be manually created in a manner that depends on an improvement in the efficiency of search or the purpose of search. It is important that indices appropriately express the content of document data for use in matching with a query input by a user or created by a computer.

Automatic creation of indices by a computer is a technique for automatically extracting words from document data to be searched, automatically associating indices with the document data, and registering corresponding search keywords in an index database. Examples of the ways the technique associates the indices with the documents include, but are not limited to, based on the part of speech of each of the words or based on statistical information. In Japanese, unlike English, words are not written separately, and thus it is necessary to automatically segment words in document data. For this segmentation, the aforementioned morphological analysis may be used. As a result of segmentation, in the case of compound words, function words such as a postpositional word (a Japanese unique word functioning as an auxiliary to a main word) and an auxiliary verb may be deleted from indices, and only content words having meaning such as independent words may be registered in the index database 214 as indices.

Moreover, n-gram indexing may be used for automatic creation of indices. In n-gram indexing, an n-gram index can be used instead of segmented words. In an n-gram index, continuous n characters in a sentence are used as an index, continuously shifting the n characters by one character from the beginning of the sentence. However, in n-gram indexing, meaningless indices are also created.

Moreover, importance may be used for automatic creation of indices. Importance indicates how closely an index extracted from document data relates to the content of the document data containing the index. Assignment of an importance to a search keyword enables a search of more appropriate document data. In general, the importance of document data may vary with the document data containing a corresponding search keyword. For instance, the indexing unit may assign at 203, an importance rating indicating the how closely an index relates to the document data.

In a technique for calculating importance, tf•idf may be used. In this case, tf is the frequency of occurrence of an index in document data. It is determined that, the more frequently a keyword occurs in document data, the more important the keyword is. That is, tf shows that, the greater the frequency of occurrence of an index is, the more important in document data the index is. Moreover, df is the number of pieces of document data in which an index occurs, out of a set of pieces of document data, and idf is the inverse of df. The value of tf•idf shows a characteristic in which, when a specific keyword frequently occurs in specific pieces of document data in a set of pieces of document data, the keyword is important, but when the specific keyword occurs in any piece of document data in the set of pieces of document data, the importance decreases. Weights can be assigned to indices using the characteristics.

Pieces of document data in which the importance of a given search keyword is high can be extracted as search results with priority using weighting based on tf•idf.

An example of manual creation of indices is when a database administrator reviews the document data, extracts, from document data, keywords considered to be important for search by viewing the content of the document data, and sets those keywords as indices.

FIG. 2B shows the flow of the outline of a natural language analysis. A natural language analysis is performed by the analysis unit. The analysis unit includes a morphological analysis unit, a syntax analysis unit, a semantic analysis unit, and a context analysis unit.

At 221, the morphological analysis unit performs a morphological analysis of clauses in the pieces of document data 211. In the morphological analysis, conjugations are used as usage information. Further, in the morphological analysis, conjugated words are restored to their respective base forms, and the parts of speech are assigned to all words extracted from document data. In the morphological analysis, for example, only results in which the order of words in a corresponding clause is morphologically correct can be used.

At 222, the syntax analysis unit performs a syntax analysis using the results of the morphological analysis. In the syntax analysis, for example, a syntactic structure is extracted using the grammar of each language of document data as usage information. A syntactic structure is a regularly arranged structure of a sentence. In the syntax analysis, for example, the modification relationships between keywords are analyzed using grammar, so that the syntactic structure of a sentence is acquired.

At 223, the semantic analysis unit extracts the meanings of keywords or sentences using a dictionary holding the semantic information of keywords. The semantic analysis removes most ambiguity occurring in the morphological analysis and the syntax analysis.

At 224, the context analysis unit performs a context analysis using the results of the semantic analysis. In the context analysis, for example, an analysis of a noun phrase and an analysis of a verb phrase are performed. In the analysis of a noun phrase, a main noun is conceptualized, and information modifying the noun is integrated. In the analysis of a verb phrase, a verb is conceptualized, and modifiers such as an adverb are integrated. Then, together with the deep case of a noun phrase, integration to a verb phrase is performed (slot filling). Understanding results 215 of a natural language analysis are acquired by 221 to 224 described above.

Figure 2C:
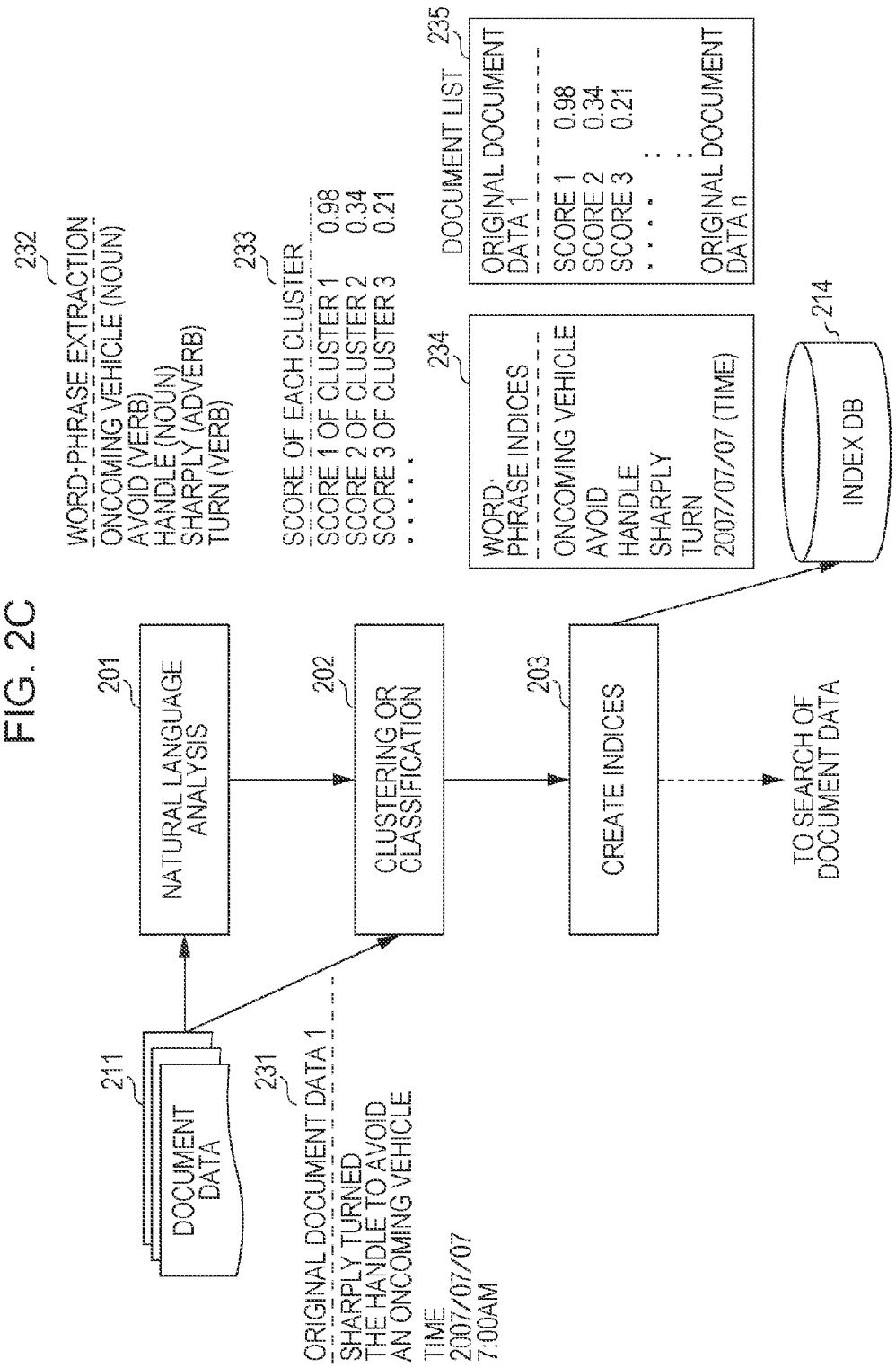
FIG. 2C describes the content of 201 to 203 in FIG. 2A using a specific example of document data.

FIG. 2C describes the content of 201 to 203 in FIG. 2A using a specific example of document data. In exemplary pieces of document data 211, a description is given using original document data 1 shown at 231. The content of the original document data 1 231 is as follows: "Sharply turned the handle to avoid an oncoming vehicle. Time Jul. 07, 2007 7:00 AM."

At 201, the analysis unit performs a natural language analysis of the original document data 1 shown at 231. The result word phrase extraction shown at 232 is as follows: "oncoming vehicle (noun) avoid (verb) handle (noun) sharply (adverb) turn (verb)". Conjugated words are restored to the respective base forms by the natural language analysis. Moreover, the part of speech is assigned to each word by the natural language analysis.

At 202, the clustering unit performs clustering or classification of the pieces of document data 211. Each of clusters 1 to 3 shown in FIG. 2C includes pieces of document data containing many common words. As such, being clustered, refers to all words included in pieces of document data. In FIG. 2C, the score of each of the clusters 1 to 3 is shown at 233. The score of each of the clusters 1 to 3 at 233 shows a score at which the original document data 1 (shown at 231) belongs to the cluster. For example, when the set of the pieces of document data relates to traffic accident reports, the cluster 1 is "accidents due to mis-operations", the cluster 2 is "accidents due to malfunction of engines", and the cluster 3 is "accidents due to rain and the like." However, for example, some clusters are meaningless to human beings. In general, in a cluster, the contribution of frequent words occurring in all pieces of document data is reduced by, for example, using tf•idf.

Moreover, each cluster does not include only a specific word or phrase. For example, when the set of the pieces of document data relates to the aforementioned traffic accident reports, in the cluster 1 for "accidents due to mis-operations," "handle" and "brake" occur as typical words, and in the cluster 2 for "accidents due to malfunction of engines," "oil" and "gasket" occur as typical words.

In this case, tf is the frequency of occurrence of a keyword in document data. It is determined that, the more frequently a keyword occurs in document data, the more important the keyword is. That is, tf shows that, the greater the frequency of occurrence of a keyword is, the more important in document data the keyword is. Moreover, df is the number of pieces of document data in which a keyword occurs, out of a set of pieces of document data, and idf is the inverse of df. The value of tf•idf shows characteristic in which, when a specific keyword frequently occurs in specific pieces of document data in a set of pieces of document data, the keyword is important, but when the specific keyword occurs in any piece of document data in the set of pieces of document data, the importance decreases. Weights can be assigned to keywords using the characteristics.

At 203, the indexing unit stores, in the index database 214, keywords 234 that are indices of the pieces of document data 211. The index database 214 may also store a document list 235. The word/phrase indices 234 include, as indices, keywords extracted from the pieces of document data 211. Creation of indices will be described below. Moreover, the word/phrase indices 234 may include, as an index, time when a corresponding piece of document data was created. Although time is not mandatory as an index of document data, time that can be used as metadata of document data such as the creation time of document data, other than keywords, may be set as an index. For example, the creation time of document data is useful in a case where an analysis needs to be performed limiting pieces of document data to be searched to pieces of document data created within a specific period. For each piece of document data, scores in individual clusters are recorded in the document list 235.

In the document list 235, only the respective scores of the clusters 1 to 3 regarding the original document data 1, which are high, may be stored, and the respective scores of the other clusters may be considered zero and thus may not be stored. This is because when the respective scores of all clusters are stored in the document list 235, the document list 235 becomes redundant, resulting in a large file size of the document list. Thus, as an example, only the respective scores of clusters that are high are stored in the document list 235, and the respective scores of the other clusters are considered zero. The respective scores of clusters regarding each of pieces of original document data 1 to n are stored in the document list 235.

FIG. 2D shows an exemplary search by matching the internal representation of document data with the internal representation of a query. At 204, a search unit matches the internal representation 241 of the query 215 created from the query 215 with the internal representation 242 of each of the pieces of document data to search for pieces of document data matching the query. At 205, the search unit displays the search results of the pieces of document data matching the query on a display unit in, for example, a list.

Figure 3A:
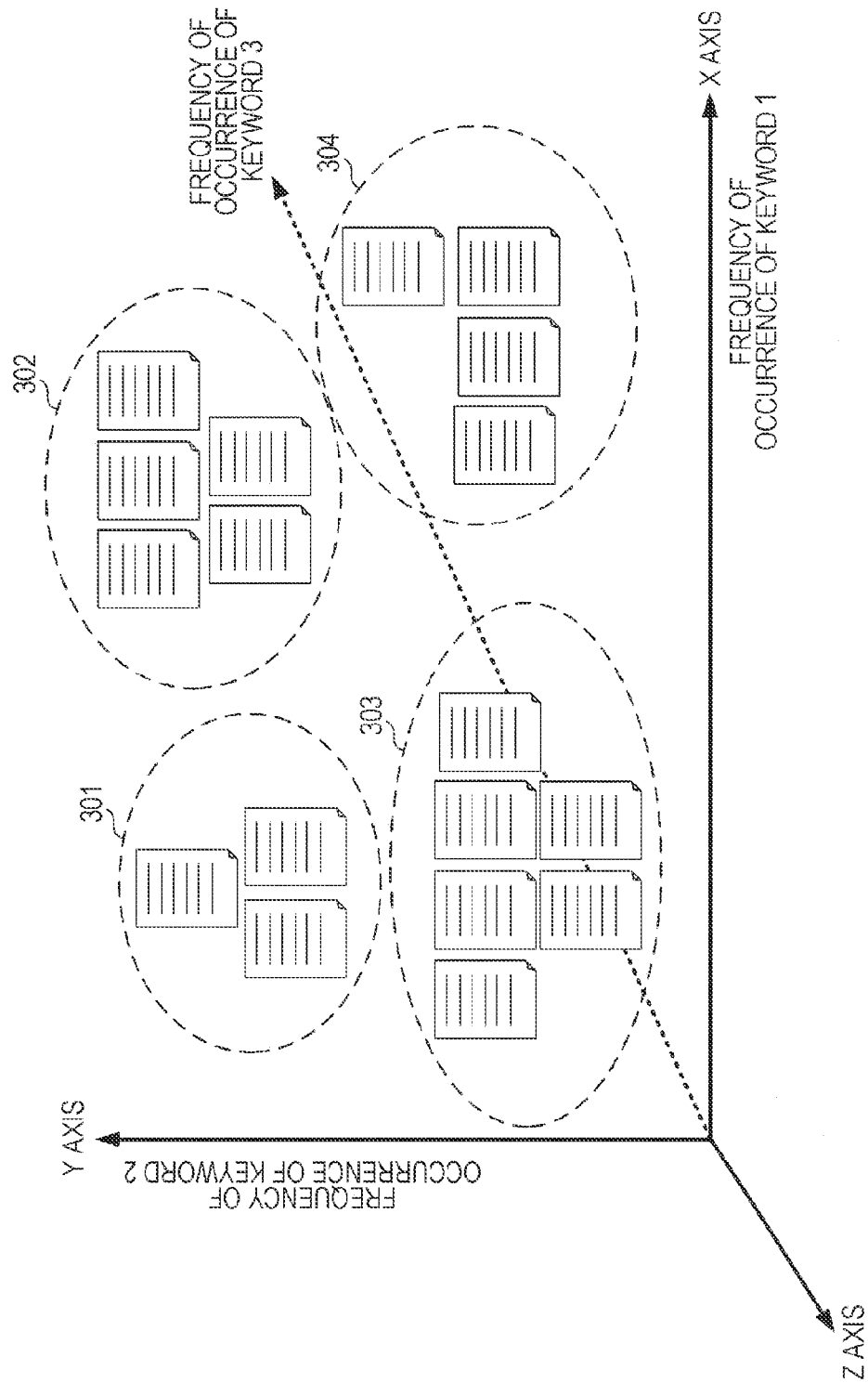
FIG. 3A shows a conceptual diagram of a first aspect of clustering of a plurality of pieces of document data.
Figure 3B:
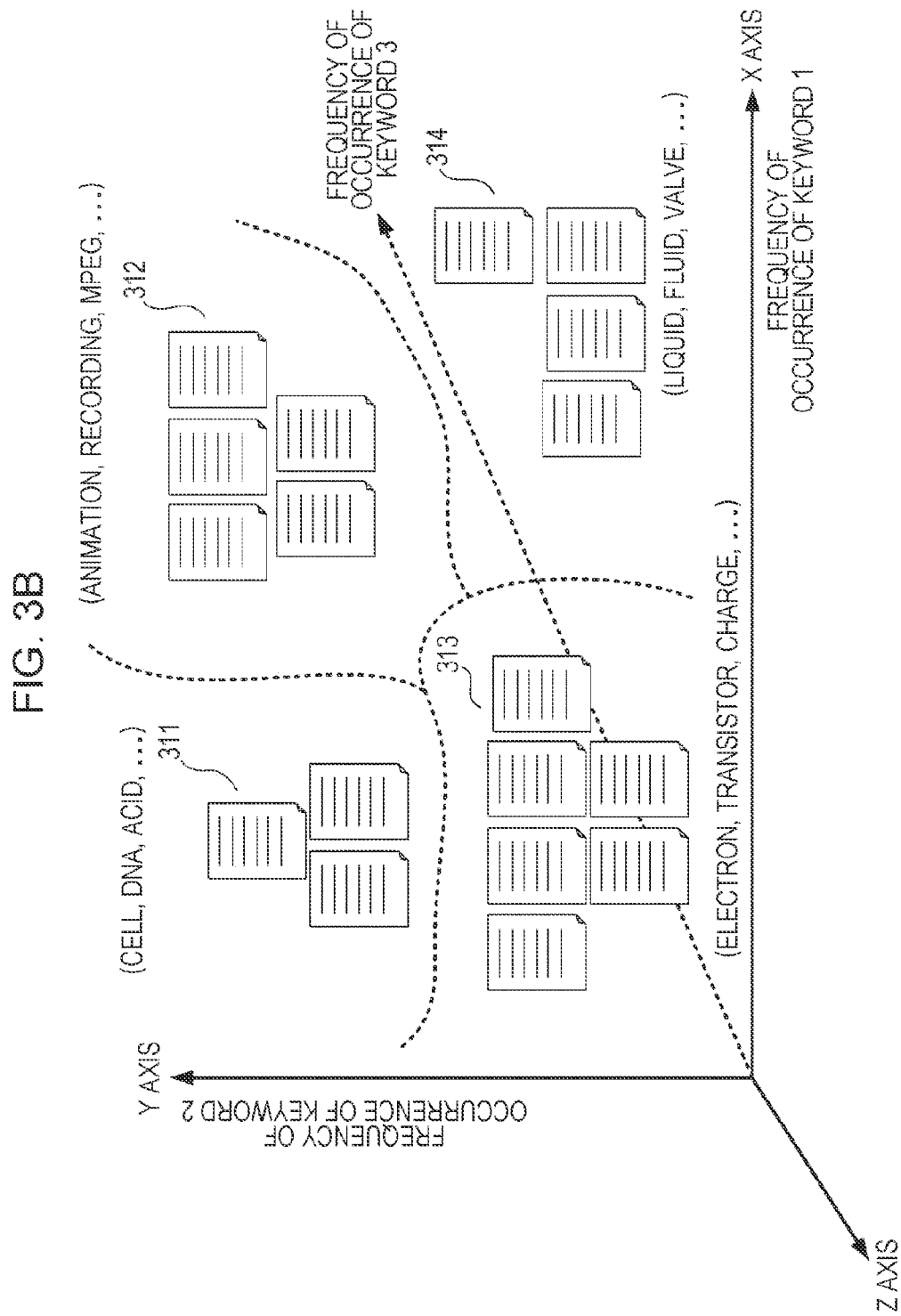
FIG. 3B shows a conceptual diagram of a second aspect of clustering of a plurality of pieces of document data.

FIG. 3A shows a conceptual diagram of a first aspect of clustering of a plurality of pieces of document data. Three aspects of clustering are shown in FIGS. 3A, 3B, and 3C respectively. The first aspect is a method in which the frequency of occurrence of each word is considered as an independent dimension, and clustering is performed by plotting pieces of document data in a vector space model (i.e., word space).

In this vector space model, the frequency of occurrence of a keyword 1, the frequency of occurrence of a keyword 2, and the frequency of occurrence of a keyword 3 are indicated by the X-axis, the Y-axis, and the Z-axis, respectively. Thus, the vector space model shown in FIG. 3A is three-dimensional. When N (N is an integer) keywords exist, the vector space model is N-dimensional. Thus, when one hundred million keywords exist, since N is one hundred million, the vector space model is one-hundred-million-dimensional.

In the first aspect, clustering is performed according to, for example, the following:

Determine the Language:

When a piece of document data is given, the language of the piece of document data (for example, Japanese, English, or Chinese) is determined from an attribute specified in the piece of document data or character codes used in the piece of document data.

Morphological Analysis:

All keywords in the piece of document data are extracted by performing a morphological analysis using a dictionary for the determined language. Furthermore, words that do not exist in the dictionary may be extracted as unknown keywords. Further, for a piece of document data, a list of the keywords contained in the piece of document data and the respective frequencies of occurrence of the keywords is created.

Define Common Keywords from the List:

The union of the respective keyword lists of pieces of document data is acquired using the aforementioned list. Each of the keywords in the list is a dimension of the vector space model shown in FIG. 3A. For example, assuming that one hundred million keywords in total have been extracted, the vector space model is one-hundred-million-dimensional. Each piece of document data is plotted in the vector space model as a point of the model.

Cluster:

The pieces of document data are clustered on the basis of the distances between the plotted points. In this operation, a group of pieces of document data within a predetermined range are clustered. For example, LSI/LSA, Latent Dirichlet Allocation (LDA), or k-means may be used as the algorithm of the clustering.

In FIG. 3A, the pieces of document data are segmented into groups 1 to 4, designated 301, 302, 303, 304, by the clustering operation.

FIG. 3B shows a conceptual diagram of a second aspect of clustering of a plurality of pieces of document data. The second aspect is a technique for clustering pieces of document data in a manner that depends on the frequency of occurrence of a common keyword. In FIG. 3B, the frequency of occurrence of the keyword 1, the frequency of occurrence of the keyword 2, the frequency of occurrence of the keyword 3, . . . , and the frequency of occurrence of a keyword N are indicated by the X-axis, the Y-axis, the Z-axis, . . . , and the N-axis (not shown), respectively, as in the first aspect.

For example, when "cell", "DNA", and "acid" are extracted as keywords, "cell", "DNA", and "acid" are keywords I, J, and K, respectively ($0 \leq I, J, K \leq N$).

In the second aspect, each piece of document data is plotted in a vector space model, as in the first aspect. In the second aspect, pieces of document data are not necessarily segmented into different fields. The reason why clustering can be performed using the second aspect is as follows. For example, assuming that one hundred million keywords in total have been extracted, the vector space model is one-hundred-million-dimensional, as described above. However, when pieces of document data are plotted in a one-hundred-million-dimensional vector space as points, the points are distributed very sparsely. Since the probability that pieces of document data covering the same topic contain common words is high, the probability that such pieces of document data are unevenly distributed in a certain space is high. For example, in pieces of document data related to biochemistry, the number of keywords referred to in animation techniques is small.

Thus, a set of pieces of document data related to biochemistry and a set of pieces of document data related to animation techniques are expected to be separated from each other in the vector space model.

In FIG. 3B, pieces of document data are segmented into the following sets by clustering: a set of pieces of document data related to biochemistry 311 that is a group 1 (cell, DNA, acid, . . . ), a set of pieces of document data related to animation techniques 312 that is a group 2 (animation, recording, MPEG, . . . ), a set of pieces of document data related to electronics 313 that is a group 3 (electron, transistor, charge, . . . ), and a set of pieces of document data related to control techniques 314 that is a group 4 (liquid, fluid, valve, . . . ).

FIG. 3C shows a conceptual diagram of a third aspect of clustering of a plurality of pieces of document data. The third aspect is a method for clustering pieces of document data in a manner that depends on the frequency of occurrence of each keyword at the barycenter of each cluster. In FIG. 3C, the frequency of occurrence of the keyword 1, the frequency of occurrence of the keyword 2, the frequency of occurrence of the keyword 3, . . . , and the frequency of occurrence of the keyword N are indicated by the X-axis, the Y-axis, Z-axis, . . . , and the N-axis (not shown), respectively, as in the first aspect.

Considering a group (cluster) of points in a vector space model as a set of material points having weights, the barycenter of the material points exists. The barycenter is the barycenter of the cluster. Regarding the weights, the individual points may have the same weight, or a weight may be assigned to each point using tf•idf. In the case of the same weight, a barycenter is defined as the average of respective coordinates of material points.

In the third aspect, each piece of document data is plotted in a vector space model, as in the first aspect. Regarding the subsequent processes, how clustering is performed varies with an algorithm to be used. Popular techniques known to those skilled in the art may be used as the algorithm.

In FIG. 3C, pieces of document data are segmented into the following groups by clustering: the group 1 (cell, DNA, acid, . . . ) 321, the group 2 (animation, recording, MPEG, . . . ) 322, the group 3 (electron, transistor, charge, . . . ) 323, and the group 4 (liquid, fluid, valve, . . . ) 324.

FIG. 4A shows the flow of creating indices according to an embodiment of the present invention. A long time spent to create indices is acceptable. On the other hand, response time at the time of performing a search or an analysis is required to be rather short. Thus, when indices are created, base processing by a time-series analysis is performed.

Indices for performing a search or an analysis of trends are created at 401, 402, 403, 404, 405, 406, 407, and 408 described below prior to performing a search or an analysis. Although not limited to, the analysis unit (806 in FIG. 8A), the clustering unit (806 in FIG. 8A), a time-series analysis unit (806 in FIG. 8A), or the indexing unit (807 in FIG. 8A) may be used as hardware to create indices.

At 401, creation of indices is started. At 402, the analysis unit reads one of the pieces of document data 411 from a storage unit into a memory. At 403, the analysis unit detects the language of the piece of document data from an attribute specified in the piece of document data or character codes used in the piece of document data using a dictionary or a dictionary including facet definitions 412 (facet definitions are described below in reference to 404). Words or facet definitions are registered in a dictionary. However, facet definitions do not relate to detection of the language. Thus, a dictionary not including facet definitions may be used to detect the language.

At 404, the analysis unit detects all keywords in the piece of document data by performing a morphological analysis using the dictionary 412 for the determined language. For example, when a word "nihonkokutokkyochou" (Japan Patent Office) exists, "nihonkokutokkyochou" is segmented into "nihonkoku" (Japan) and "tokkyochou" (Patent Office) using the dictionary 412. However, when there is no dictionary, it cannot be determined whether "nihonkokutokkyochou" is segmented after "nihonkoku" or "nihonkokutok". In facet definitions, only specified words of interest are defined as facet keywords, and the facet definitions are used to disregard the other words.

At 405, the clustering unit clusters or classifies the pieces of document data 411 to be processed on the basis of the respective frequencies of occurrence of the detected keywords. Clusters or classes (also called document clusters) are formed by the clustering or classification. The probability that each piece of document data belongs to a cluster or a class is evaluated as a score by the clustering or classification. The score is indicated as, for example, a real number ranging from 0 to 1. Then, for example, a document data score table of keyword (vertical axis) by cluster (horizontal axis) is created. These document data scores are stored in a document data score database 413. Clustering or classifying pieces of document data also may include clustering or classifying keywords.

At 406, for each keyword k, the clustering unit acquires the number ($x_{c,k}(t)$) of occurrences of pieces of document data containing the keyword in each cluster c for each time slice t. The number of occurrences of pieces of document data is acquired as the sum of the respective scores of all pieces of document data according to equation 11 described below.

Equation 11

$$x_{c,k}(t) = \sum_{d \ni k} s_c(d) \qquad [E11]$$

$x_{c,k}(t)$ is the number of occurrences of pieces of document data d containing a keyword k in each cluster c.

$s_c(d)$ is a score at which each of the pieces of document data d belongs to the cluster c.

$\Sigma$ is the sum of the respective scores of all the pieces of document data d containing the keyword k.

In a search at runtime described in reference to FIG. 4B, e.g., with regard to 421 to 426 described below, instead of the number of occurrences of pieces of document data containing a keyword, for each cluster, the sum of the respective scores of all pieces of document data containing a keyword is calculated for use, as shown in equation 11 described above. This operation is convenient in that the contributions from pieces of document data can be reduced. The probability that the pieces of document data belong to a cluster is low. That is, in the pieces of document data, the number of related keywords is relatively small.

The number of occurrences of the pieces of document data may be stored in the document data score database 413. The time slice may be any time unit, for example, one year, one month, one week, one day, four hours, or five minutes.

At 407, for each keyword k, the time-series analysis unit performs a time-series analysis (spectral decomposition) of the number $x_{c,k}(t)$ of occurrences of pieces of document data containing the keyword for each cluster c. The time-series analysis may be performed by, for example, the Fourier transform or the wavelet transform. As a result of the spectral decomposition, for each keyword, as many frequency distributions (spectral decomposition) $f(\omega)_{c,k}$ as the number of clusters are acquired. The spectral decomposition $f(\omega)_{c,k}$ is the frequency distribution of a time series of the frequency of occurrence of pieces of document data containing the keyword k in the cluster c. In a case where the spectral decomposition is a Fourier transform, $f(\omega)_{c,k}$ is a Fourier coefficient. In a case where the spectral decomposition is the wavelet transform, $f(\omega)_{c,k}$ is a wavelet coefficient. The acquired spectral decomposition $f(\omega)_{c,k}$ is stored in a frequency distribution database 414.

This spectral analysis can be performed at runtime. However, in general, since the number of keywords is huge, it is very difficult to perform spectral decomposition for all the keywords at runtime. Thus, in embodiments of the present invention, spectral decomposition is performed for each cluster instead of a keyword.

At 408, creation of indices is terminated after repeating the aforementioned 406 and 407 for all the keywords for all the clusters.

FIG. 4B shows the flow of performing a runtime process using the frequency distribution created in FIG. 4A. The process at runtime is performed according to 421, 422, 423, 424, 425, and 426. At 421, the search unit starts the process at runtime.

At 422, the search unit receives a search query q input by a user or created by a computer and stores the search query q in a memory or a storage unit. The search query q contains a search keyword. The search unit may extract a relevant keyword associated with the keyword in the search query q upon receiving the search query q.

At 423, the search unit narrows down the set of pieces of document data d 411 (FIG. 4A) by the use of the keyword in the search query q at runtime using document data scores stored in the document data score database 413. A time series to be analyzed is dynamically created by narrowing down the set of pieces of document data.

At 424, the search unit approximates the set of pieces of document data d, which have been narrowed down at 423, with the linear sum of clusters. That is, spectral decomposition in a set of pieces of document data narrowed down by each keyword is approximated by the contribution from each cluster. For example, when clustering is performed by the LSA or the LSI, clusters are defined as vectors perpendicular to each other. Thus, approximation can be performed within an error corresponding to dimensions dropped in dimensionality reduction, as shown in equation 12 described below.

Equation 12

$$f(\omega)_{q,k} = \sum_c a_c f(\omega)_{c,k} \qquad [E12]$$

$f(\omega)_{q,k}$ is a frequency coefficient of a time series of the frequency of occurrence of the pieces of document data d containing the keyword k in the results of the search query q.

Also, $a_c$ is acquired according to equations 13 and 14 described below.

Equation 13

$$D_q = \sum_c a_c D_c \quad [E13]$$

Equation 14

$$a_c = \langle D_q | D_c \rangle \quad [E14]$$

$D_q$ is a vector corresponding to a set of pieces of document data narrowed down. $D_q$ is defined in a space in which each piece of document data is set as a dimension. The value of the component of each dimension is one or zero in a manner that depends on whether the set of pieces of document data narrowed down contains a piece of document data corresponding to the dimension.

$D_c$ is a vector corresponding to a cluster. In $D_c$, the value of each component is a real number ranging from 0 to 1 in a manner that depends on the probability that or a score at which a piece of document data corresponding to each dimension belongs to a cluster or a class.

Moreover, $a_c$ is the inner product of $D_q$ and $D_c$ and represents the projection of the set $D_q$ of pieces of document data to components of each cluster.

$D_{c1}$ and $D_{c2}$ are eigenvectors in the LSA in different clusters. For example, when $D_q$ is (1, 1, 1, 0, 0, ...), $D_{c1}$ is (0.1, 0.4, 0.3, 0.1, 0.0, ...), and $D_{c2}$ is (0.2, 0.0, 0.1, 0.2, 0.1, ...), an inner product $a_{c1}$ of $D_q$ and $D_{c1}$ is acquired by 1×0.1+1×0.4+1×0.3+ ..., and an inner product $a_{c2}$ of $D_q$ and $D_{c2}$ is acquired by 1×0.2+1×0.0+1×0.1+ ....

At 425, the search unit reads, from the frequency distribution database 414, the frequency distribution $f(\omega)_{c,k}$ of a time series of the frequency of occurrence of pieces of document data containing each keyword in each cluster and calculates the frequency distribution of the keyword in the set of pieces of document data narrowed down by the search query according to equation 12. That is, the search unit infers, from the time-series change of a keyword for each cluster, the time-series change of the keyword in a set of pieces of document data narrowed down by a search query.

The basis for considering that this inference is appropriate is that, since each cluster can be considered to be a set of pieces of document data that are conceptually similar, the trend of fluctuations of a keyword in the cluster can be considered to reflect characteristics specific to a corresponding field. In general, a set of pieces of document data narrowed down by a search query can be considered to include a plurality of concepts. Thus, it is not unnatural to assume that the fluctuations of each keyword in the set of pieces of document data behave as a compound of the trends of fluctuations in the concepts.

At 426, the search unit terminates the process at runtime. In the aforementioned processes, at runtime, for each keyword k in a set of pieces of document data narrowed down by the search query q, the spectral decomposition $f(\omega)_{q,k}$ of time-series fluctuation in the number of occurrences of pieces of document data containing the keyword k is acquired using equation 12.

Figure 5A:
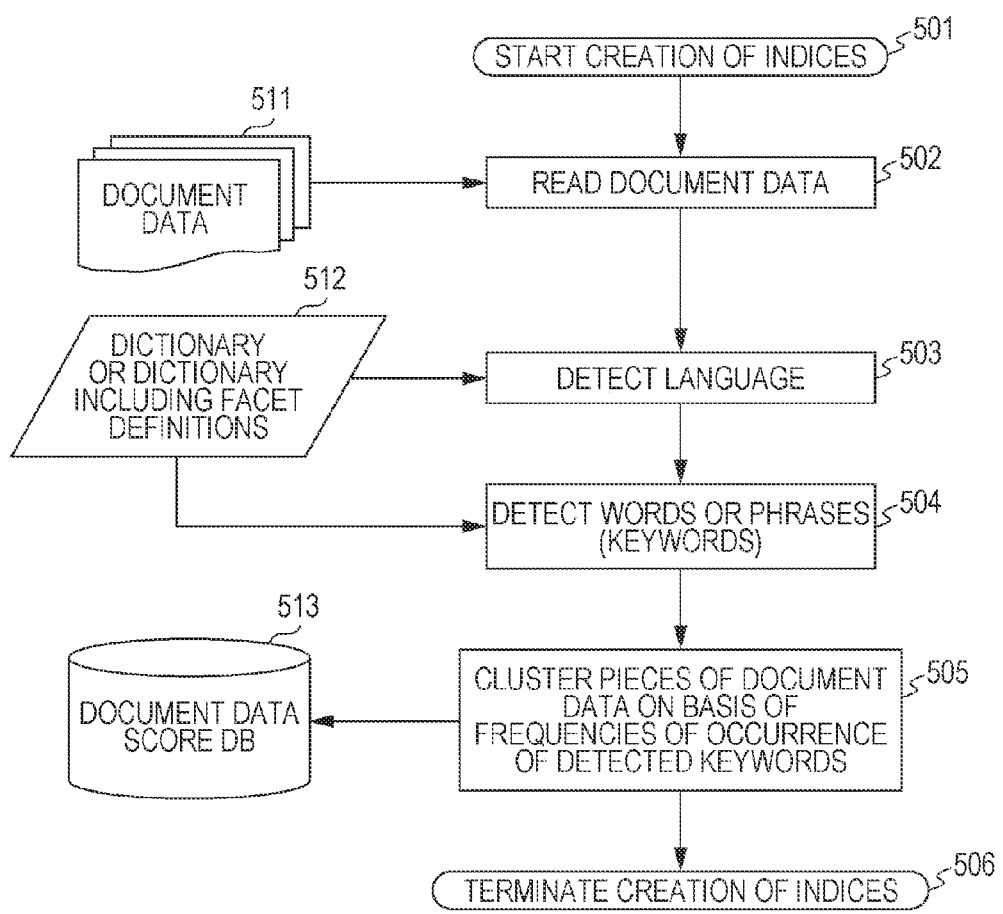
FIG. 5A shows the flow of creating indices according to an embodiment of the present invention.

FIG. 5A shows the flow of creating indices according to an embodiment of the present invention. Indices for performing a search or an analysis of trends are created according to 501, 502, 503, 504, 505, and 506 described below prior to performing a search or an analysis. Although not limited to, the analysis unit (806 in FIG. 8A), the clustering unit (806 in FIG. 8A), the time-series analysis unit (806 in FIG. 8A), or the indexing unit (807 in FIG. 8A) may be used as hardware to create indices.

At 501, creation of indices is started. At 502, the analysis unit reads one of pieces of document data 511 from a storage unit into a memory.

At 503, the analysis unit detects the language of the piece of document data from an attribute specified in the piece of document data or character codes used in the piece of document data using a dictionary or a dictionary including facet definitions 512.

At 504, the analysis unit detects all keywords in the piece of document data by performing a morphological analysis using the dictionary 512 for the determined language.

At 505, the clustering unit clusters or classifies the pieces of document data 511 to be processed on the basis of the respective frequencies of occurrence of the detected keywords. Clusters or classes (also called keyword clusters) are formed by the clustering or classification. The probability that each piece of document data belongs to a cluster or a class is evaluated as a score by the clustering or classification. The score is indicated as, for example, a real number ranging from 0 to 1. Then, for example, a document data score table of keyword (vertical axis) by cluster (horizontal axis) is created. These document data scores are stored in a document data score database 513. Clustering or classifying pieces of document data also may include clustering or classifying keywords.

FIG. 5B shows the flow of performing a runtime process using the document data scores created in FIG. 5A. The process at runtime is performed according to 521, 522, 523, 524, 525, 526, 527, 528, and 529.

At 521, the search unit starts the process at runtime. At 522, the search unit receives a search query q input by a user or created by a computer and stores the search query q in a memory or a storage unit. The search query q contains a search keyword. The search unit may extract a relevant keyword associated with the keyword in the search query q upon receiving the search query q.

At 523, the search unit narrows down the set of pieces of document data d 511 (FIG. 5A) by the search query q at runtime using document data scores stored in the document data score database 513. A time series to be analyzed is dynamically created by narrowing down the set of pieces of document data.

At 524, the search unit acquires, from the time series of the keyword in the narrowed set of pieces of document data d, (e.g., which have been narrowed down by the search query at 523), a time series of each cluster in the narrowed set of pieces of document data d. Acquiring a time series means expressing the change of the frequency of occurrence over time as a function of time. The time series can be acquired according to, for example, equation 15 described below.

Equation 15

$$\overline{c}(t) = \sum_x s_c(x) \overline{x}(t) \quad [E15]$$

c̄(t) is the sum regarding all keywords belonging to a cluster in a time series.

$s_c(x)$ is the weight of a keyword x in a cluster c.

x̄(t) is a normalized time series of the frequency of occurrence of pieces of document data containing each keyword, the time series having been smoothed.

Figure 6:
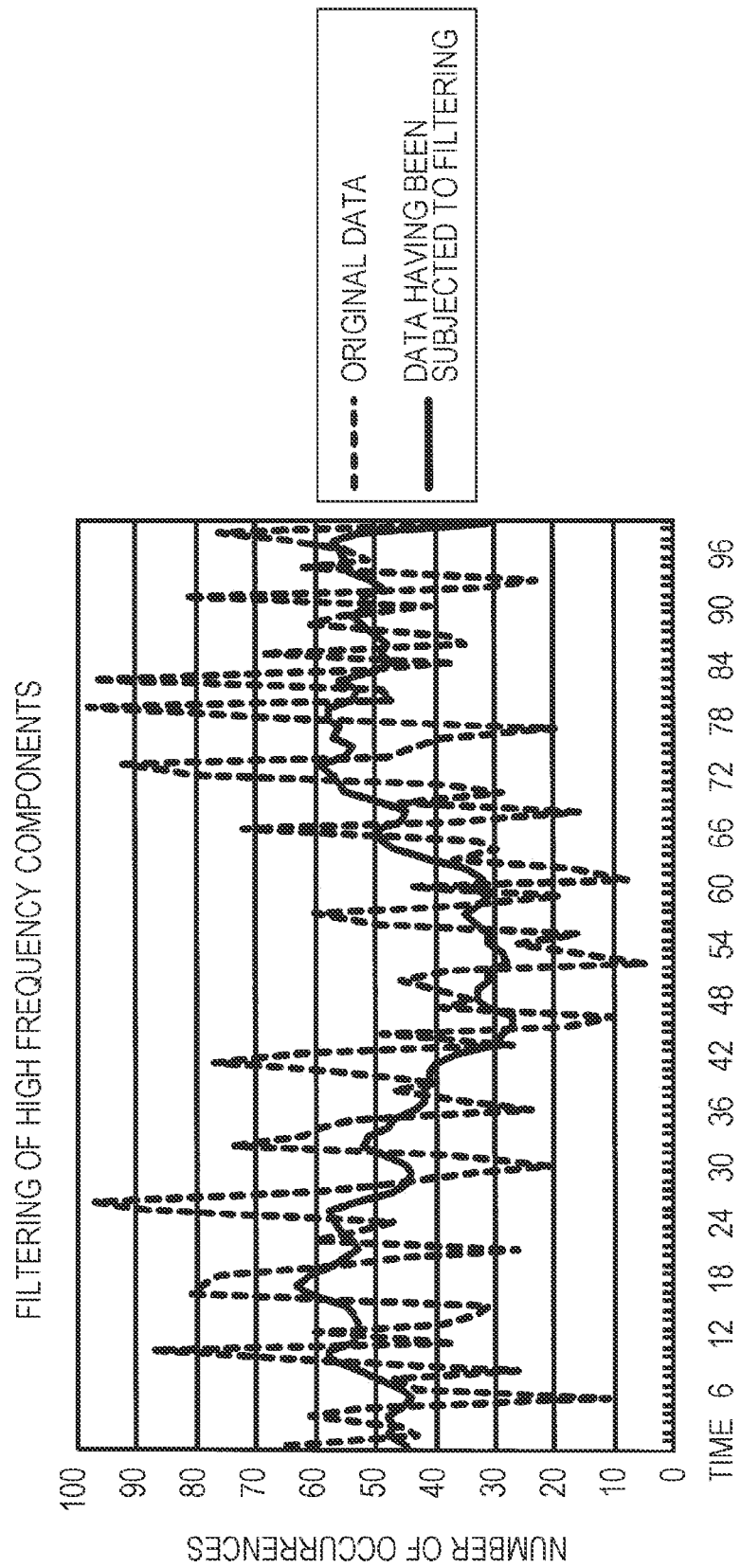
FIG. 6 shows a graph of the frequency of occurrence of a keyword in document data (original data) over time, the frequency of occurrence having been processed using a filter function.

At 525, the search unit performs a frequency analysis of the acquired time series of each cluster. The search unit may process the frequency of occurrence of a keyword in document data (original data) over time using a filter function, as shown in FIG. 6. When filtering is performed in a frequency analysis using a filter function, the search unit calculates an index value for each cluster. An index value can be acquired according to, for example, equation 10 described above. Then, a search result display unit displays, for example, for individual clusters, the analysis results regarding clusters having high index values. The frequency analysis is similar to the time-series analysis performed at 407 in FIG. 4A. Exemplary analysis results are shown in FIG. 7B described below.

At 526, the search unit queries the user about whether to perform drill-down to each keyword. In general, drill-down means performing an analysis by narrowing down objects from general data to detailed data. The search unit displays a list of clusters so as to enable the user to select a cluster to be subjected to drill-down. The display is performed, for example, in a manner in which a cluster can be selected. The user selects a cluster to be subjected to drill-down. When drill-down is performed, the process proceeds to 527. On the other hand, when drill-down is not performed, the process proceeds to 529, and the process at runtime is terminated.

At 527, the search unit receives information on the selected cluster in response to the selection from the user. At 528, the search unit performs, for the selected cluster, a time-series analysis of keywords in descending order of weight in the cluster, as necessary. In this case, the time-series analysis represents analyzing the characteristics of the aforementioned function of time. The search unit performs, for example, the Fourier transform or the wavelet transform as the time-series analysis of keywords characterizing the selected cluster. The analysis results are presented to the user.

At 529, the search unit terminates the process at runtime. In the aforementioned steps, at runtime, for each cluster c in a set of pieces of document data narrowed down by the search query q, the spectral decomposition $f(\omega)_{q,c}$ of time-series fluctuation in the number of occurrences of pieces of document data belonging to the cluster c and the spectral decomposition of keywords characterizing a selected cluster are acquired.

In a search at runtime shown, e.g., at 521 to 529, described above, the frequency of occurrence of a keyword for each cluster is calculated from the number of occurrences of pieces of document data containing the keyword. At this time, a weight is assigned to the contribution of each keyword to each cluster using the score of the keyword in the cluster. This operation is convenient in that the contribution of a keyword to a time series of a cluster is reduced, the probability that the keyword belongs to the cluster being low.

FIG. 6 shows a graph of the frequency of occurrence of a keyword in document data (original data) over time, the frequency of occurrence having been processed using a filter function.

The process can be performed at 524 in FIG. 5B. A technique for a cluster analysis for applying a time-series analysis based on, for example, frequency decomposition to the number of occurrences of a large number (up to one billion) of keywords will next be described. In particular, a method for extracting the behavior of low frequencies (moderate and major fluctuations) will be described.

A function convolving an original time series x(t) is first considered for preparation. This function is shown by equation 16 described below. The function represents a time series in which fluctuations in high frequencies are cut off using the value of n as a cut-off value.

Equation 16

$$\hat{x}(t) = \sum_{i=0}^{n} x(t+i) \qquad [E16]$$

x̂(t) is a smoothed time series (having not been normalized).

x(t) is an original time series.

i is used to acquire the sum in a range of integers 0 to n.

t is time (time slice).

n is the width of a window for performing convolution.

In the example in FIG. 6, a dotted line indicates an original time series, and a solid line indicates fluctuations from which high frequencies are removed. In a case where the process is performed using practical text analysis software, the process can be readily implemented by assigning first time stamps, the granularity of which is coarser than that of second time stamps, associated with original document data when indices are assigned to document data and considering the first time stamps as facets.

At 524 in FIG. 5B, furthermore, the amplitude of the smoothed time series x̂(t) may be normalized according to equations 17 and 18 described below. According to these equations, high frequencies are removed, and the amplitude of the time series is normalized.

Equation 17

$$\langle \hat{x}^2 \rangle = \frac{1}{T} \sum_{t=0}^{T} \hat{x}(t)^2 \qquad [E17]$$

Equation 18

$$\bar{x}(t) = \langle \hat{x}^2 \rangle^{-\frac{1}{2}} \hat{x}(t) \qquad [E18]$$

$\langle \hat{x}^2 \rangle$ is the root mean square of the frequency of occurrence.

T is an entire interval (time) of a time series.

x̄(t) is a normalized time series of the frequency of occurrence of document data, the time series having been smoothed.

x̂(t) is a smoothed time series (having not been normalized) of the frequency of occurrence of document data.

The reason for performing normalization in this manner is to equalize the contribution from a frequent keyword with the contribution from an infrequent word.

Furthermore, instead of the time series x(t) for individual keywords, a time series of a keyword cluster c(t) is considered. Since the number of individual keywords is generally huge, it is impractical to perform, at runtime, a time-series analysis that takes much time for calculation. Thus, the time series of the keyword cluster c(t) is considered because general trends can be grasped by first performing a time-series analysis for a small number of keyword clusters in which keywords are grouped without performing a time-series analysis for all clusters. The number of keywords contained in a set of pieces of document data depends on the size of the set of pieces of document data and is, for example, the tens of millions to the hundreds of millions. In this case, the number of keyword clusters can be defined as, for example, the tens to the tens of hundreds. In this case, at 524 in FIG. 5B, equation 19 described below can be used.

Equation 19

$$\overline{c}(t) = \sum_{x} s_c(x)\overline{x}(t) \quad [E19]$$

$\overline{c}(t)$ is the sum regarding all keywords belonging to a cluster in a time series.

$s_c(x)$ is the weight of a keyword x in a cluster c.

$\overline{x}(t)$ is a normalized time series of the frequency of occurrence of pieces of document data containing each keyword, the time series having been smoothed.

In this manner, instead of a time series for individual keywords, a time series of a cluster (concept composed of keywords correlating with each other) can be acquired. Owing to the aforementioned normalization, even in the case of a relatively infrequent keyword, when fluctuations in the frequency of occurrence of the keyword are large, the keyword makes a large contribution to fluctuations in a cluster.

FIG. 7A shows the number of occurrences of a keyword for each cluster over time. The number of occurrences (frequency of occurrence) is acquired at 525 in FIG. 5B.

Out of clusters 1, 2, and 3, a cluster the frequency of which is lowest is the cluster 3.

FIG. 7B shows the result of selecting a cluster having a high index value from the clusters 1 to 3 shown in FIG. 7A. A cluster having a high index value is selected by a user or a computer, as shown in FIG. 7B. The respective index values of the clusters 1 to 3 are as follows: cluster 1=1.2, cluster 2=5.8, and cluster 3=17.2. Thus, in FIG. 7B, since the cluster 3 having a high index value is subjected to drill-down, only the cluster 3 is shown.

FIG. 8A shows a system diagram of a computer 801 according to an embodiment of the present invention, the computer including a document data processing unit 806 and an indexing unit 807.

A system according to an embodiment of the present invention, includes a computer 801 for creating indices (hereinafter also called an "index creating computer"), one or more servers 802a, 802b, 802c, . . . 802n (collectively referenced as 802) connected to the index creating computer 801 via a network, one or more search servers 803, and a user terminal 804 connected to the search server via a network.

The index creating computer 801 includes a crawler 805, a document data processing unit 806, an indexing unit 807, a cache 808, and a thumbnail processing unit 809. The crawler 805 collects pieces of document data 810, for example, Web pages, from the servers 802. The crawler 805 is also called a robot or a spider. The crawler 805 stores the collected pieces of document data 810 in, for example, a storage unit (not shown). The crawler further stores the pieces of document data 810 in the cache 808.

The document data processing unit 806 includes an analysis unit, a clustering unit, and a time-series analysis unit. The analysis unit performs a natural language analysis. The clustering unit performs clustering or classification of document data. The time-series analysis unit performs, for each keyword, a time-series analysis of the number of occurrences of pieces of document data containing the keyword for each cluster.

The indexing unit 807 creates the text indices, facet indices, and thumbnail indices of the pieces of document data 810 from search keywords. These indices are stored in an index database 835. The indices are used by a search runtime 811. The text indices are distinguished from the facet indices for an implementation design; however, the text indices may be the same as the facet indices. The search runtime 811 may exist in the index creating computer 801 or another server. When the search runtime 811 exists in another server, the index database 835 is copied to the other server. Alternatively, the index database 835 may be disposed in a shared disk in a storage area network (SAN) so that both the index creating computer 801 and the other server can access the index database 835.

The indexing unit 807 further stores cluster information, scores at which or probabilities (first vectors) that document data belongs to clusters or classes. The indexing unit 807 may further store index data in a cluster database (833 in FIG. 8B). a document data score database (834 in FIG. 8B), and the index database (835 in FIG. 8B), respectively.

The thumbnail processing unit 809 creates, on the basis of the metadata of at least one of the pieces of document data 810 stored in the cache, thumbnails for displaying the pieces of document data on a screen as icons. The metadata is data for identifying, for example, the type and content of a document.

The search server 803 receives a query from the user terminal 804, searches the pieces of document data 810, and then sends the search results to the user terminal 804.

Figure 8B:
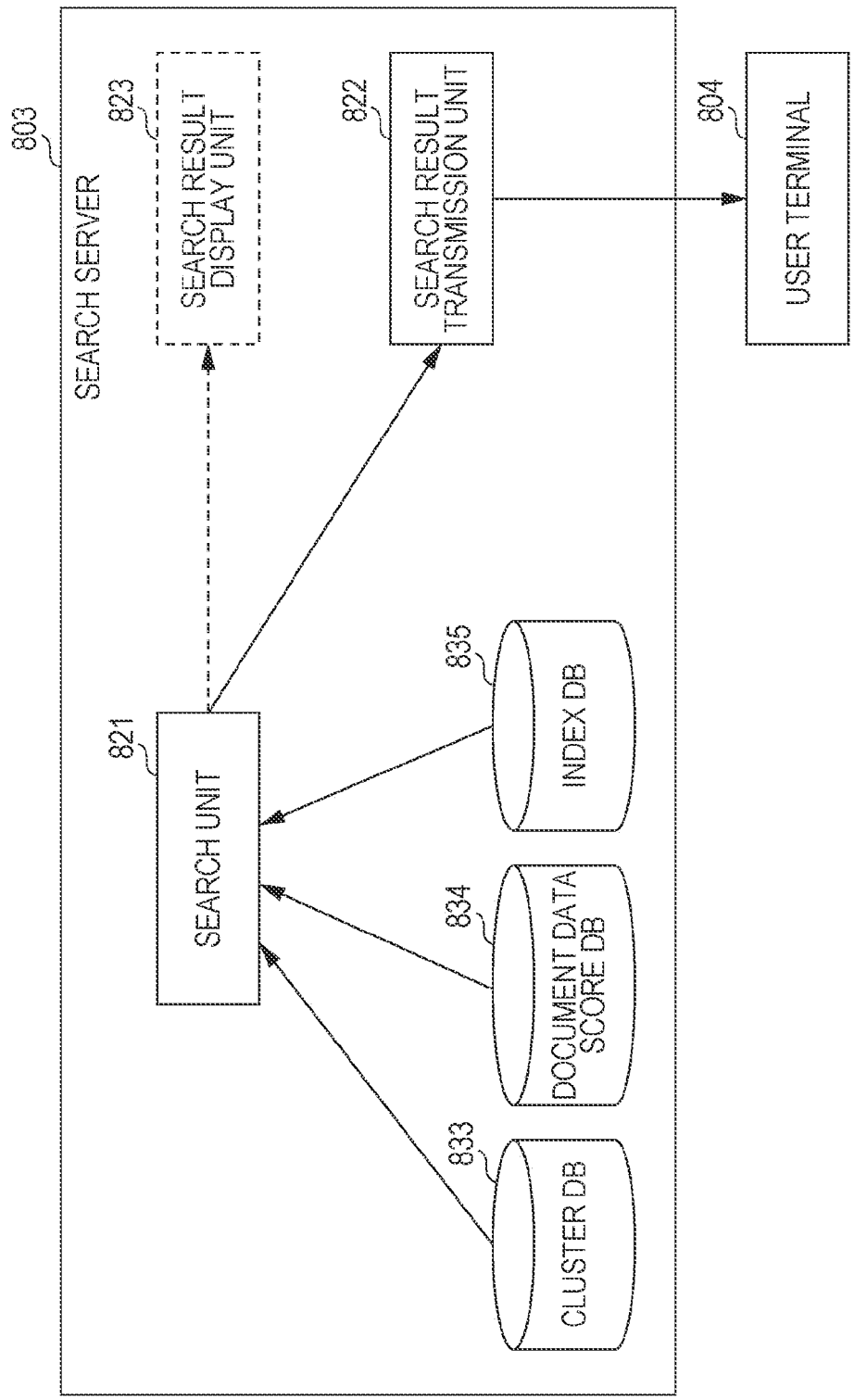
FIG. 8B shows a system diagram of a search server according to an embodiment of the present invention, the search server including a search unit.

FIG. 8B shows a system diagram of a search server 803 according to an embodiment of the present invention, the search server 803 including a search unit 821. The search server 803 includes a search unit 821. When the search server 803 also functions as a user terminal, the search server 803 includes a search result display unit 823. When the search server 803 is capable of sending search results to the user terminal 804, the search server 803 includes a search result transmission unit 822. The search unit 821 searches document data using cluster information, the scores of document data, and index data respectively from the cluster database 833, the document data score database 834, and the index database 835.

Figure 9:
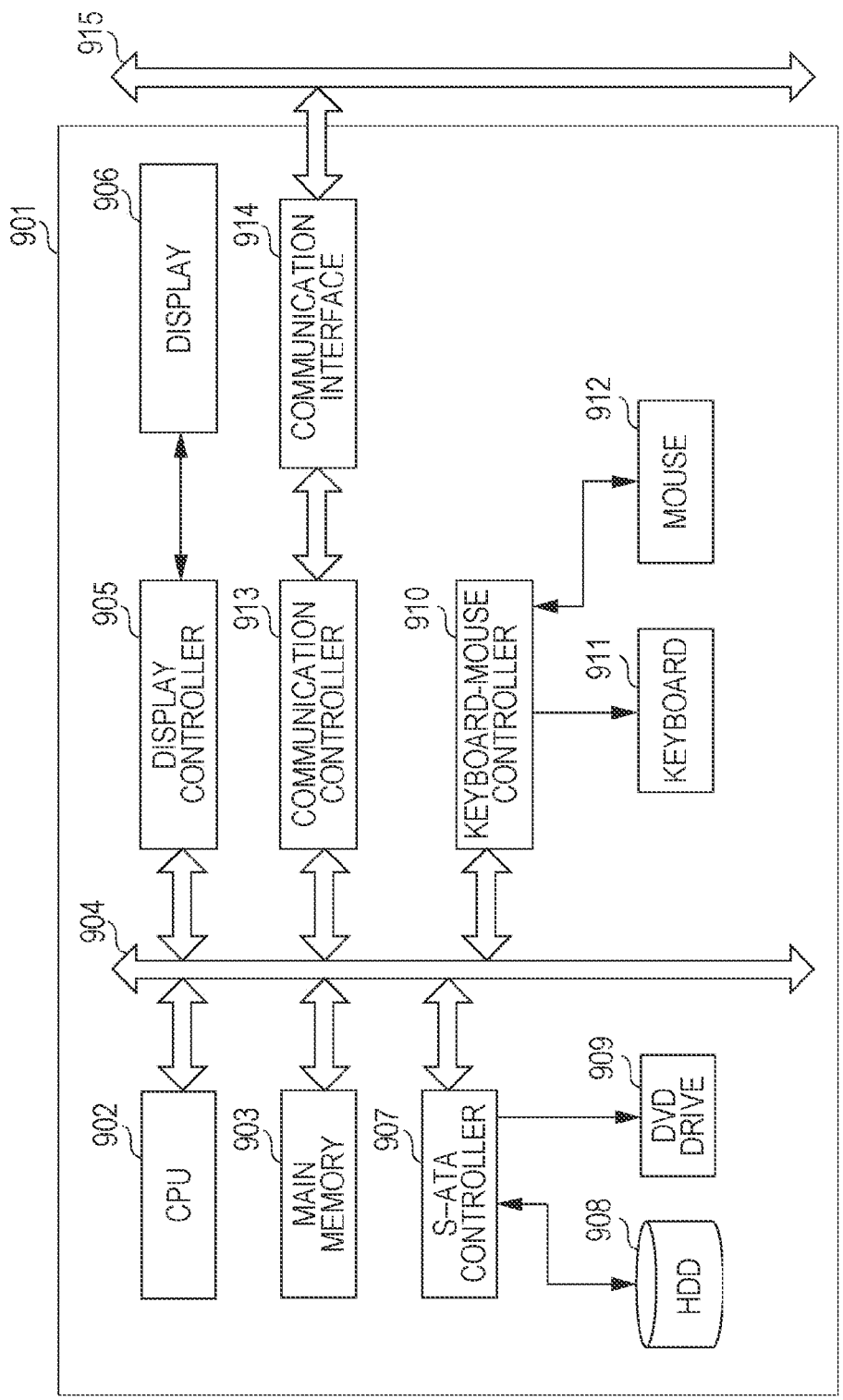
FIG. 9 shows a block diagram of the computer hardware of each system in FIGS. 8A and 8B in an embodiment of the present invention.

FIG. 9 shows a block diagram of the computer hardware of the system in FIG. 8 in an embodiment of the present invention. A computer 901 includes a CPU 902 and a main memory 903 connected to a bus 904. The CPU 902 is preferably based on the 32-bit or 64-bit architecture. For example, the Xeon (trademark) series, the Core (trademark) series, the Atom (trademark) series, the Pentium (trademark) series, or the Celeron (trademark) series of Intel Corporation or the Phenom (trademark) series, the Athlon (trademark) series, the Turion (trademark) series, or Sempron (trademark) of AMD can be used as the CPU 902. A display 906 such as a TFT monitor is connected to the bus 904 via a display controller 905. The display 906 is used to display, for management of computer systems, information on a computer system connected to a network via a communication line and information on software running on the computer system using an appropriate graphic interface. A hard disk or a silicon disk 908 and a CD-ROM, DVD, or BD drive 909 are connected to the bus 904 via an IDE or S-ATA controller 907.

An operating system, application programs, and data are stored in the hard disk 908 to be loadable to the main memory. The CD-ROM, DVD, or BD drive 909 is used to additionally install a program from a CD-ROM, a DVD-ROM, or a BD to the hard disk as necessary. Moreover, a keyboard 911 and a mouse 912 are connected to the bus 904 via a keyboard-mouse controller 910.

A communication interface 914 is based on, for example, the Ethernet (trademark) protocol. The communication interface 914 is connected to the bus 904 via a communication controller 913, physically connects the computer system to a communication line 915, and provides a network interface layer to the TCP/IP communication protocol that is a communication function of an operating system of a computer system. In this case, the communication line may be a wired LAN environment or a wireless LAN environment based on wireless LAN connectivity standards, for example, IEEE 802.11a/b/g/n.

FIG. 10 shows a time series of a cluster acquired according to an embodiment of the present invention. The graph shows, in a set of pieces of document data of accident reports, each time series in which the frequency of occurrence of pieces of document data containing a corresponding one of keywords related to each other: "handle", "steering", "turn", and "avoid", the frequency of occurrence being collected for each year, and a time series of a cluster acquired by summing respective weights assigned to the keywords in a manner that depends on the respective scores of the keywords in a keyword cluster containing the keywords. General characteristics can be grasped by performing an analysis on a time series of a cluster instead of performing an analysis on a time series of each keyword, as shown in the graph.

Aspects of the present invention provide a processing method for a time-series analysis of keywords. The method causes a computer to perform segmenting, e.g., by performing at least one of clustering and classifying, pieces of document data based at least in part on frequencies of occurrence of keywords in the pieces of document data, where the pieces of document data include a description in a natural language, the segmenting resulting in creating at least one document cluster and at least one keyword cluster.

The method further causes a computer to perform a time-series analysis of frequencies of occurrence of pieces of document data containing individual keywords in clusters or classes (hereinafter also called document clusters) into which the pieces of document data are clustered or classified or a time-series analysis of frequencies of occurrence of pieces of document data containing clusters or classes (hereinafter also called keyword clusters) into which the individual keywords are clustered or classified, frequency distribution showing variation of the frequencies of occurrence of the pieces of document data being acquired by the time-series analysis.

For instance, time series analysis is further performed by acquiring a frequency distribution showing variation of the frequencies of occurrence of the pieces of document data by performing at least one of: a time-series analysis of frequencies of occurrence of pieces of document data containing individual keywords in at least one document cluster, and a time-series analysis of frequencies of occurrence of pieces of document data containing at least one keyword cluster.

According to further aspects of the present invention, a processing system is provided for a time-series analysis of keywords. The processing system includes a clustering unit for clustering or classifying pieces of document data, each of which is a description, e.g., of a phenomenon, in a natural language, on the basis of frequencies of occurrence of keywords in the pieces of document data. In this regard, individual keywords are also clustered or classified by clustering or classifying the pieces of document data. Still further, a time-series analysis unit performs a time-series analysis of frequencies of occurrence of pieces of document data containing individual keywords in clusters or classes (document clusters) into which the pieces of document data are clustered or classified or a time-series analysis of frequencies of occurrence of pieces of document data containing clusters or classes (keyword clusters) into which the individual keywords are clustered or classified, frequency distribution showing variation of the frequencies of occurrence of the pieces of document data being acquired by the time-series analysis.

Moreover, aspects of the present invention provide a computer program product causing a computer to perform the aforementioned method and/or for performing software aspects of the processing system.

According to aspects set out in greater detail herein, trends may be detected using methods which are suitable for finding general trends, e.g., in search keywords, with priority. Moreover, document analysis may be implemented, even where the number of pieces of document data containing keywords is large, e.g., the number of keywords in document data to be analyzed on the time series may reach into the hundreds of millions to the billions. Moreover, time-series analysis may be performed to find general trends in search keywords within even relatively short defined response times required by an application.

By analyzing a time series of a cluster instead of a keyword, as described more fully herein, the number of clusters is much smaller than the number of keywords. Thus, a compute-intensive analysis such as a frequency analysis can be performed efficiently. Also, a cluster is acquired by clustering or classifying pieces of document data (document clusters) or clustering or classifying individual keywords in document clusters (keyword clusters). Thus, the probability that a cluster relates to meaningful trends is high.

Further, the probability that a plurality of keywords in a cluster is contained in a common document data is high. That is, co-occurrence relationships exist between the plurality of keywords. Thus, the probability that the respective time-series changes of the keywords offset each other due to different fluctuation patterns is low.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

What is claimed is:

1. A method for processing a time-series analysis of keywords, the method comprising:
    segmenting, with a processor, by performing at least one of clustering and classifying, pieces of document data based at least in part on frequencies of occurrence of keywords in the pieces of document data, wherein the pieces of document data include a description in a natural language, the segmenting resulting in creating at least one document cluster and at least one keyword cluster; and
    acquiring a frequency distribution showing variation of the frequencies of occurrence of the pieces of document data by performing, with the processor, at least one of:
        a time-series analysis of frequencies of occurrence of pieces of document data containing individual keywords in at least one document cluster, and a time-series analysis of frequencies of occurrence of pieces of document data containing at least one keyword cluster.

2. The method according to claim 1, further comprising:
acquiring, for each keyword, frequencies of occurrence of pieces of document data containing the keyword in each document cluster for each time series after segmenting.

3. The method according to claim 2, wherein acquiring frequencies of occurrence of pieces of document data for each time series includes performing equation:

$$x_{c,k}(t) = \sum_{d \ni k} s_c(d)$$

wherein $x_{c,k}(t)$ is a number of occurrences of pieces of document data d containing a keyword k in each cluster c,
wherein $s_c(d)$ is a score at which each of the pieces of document data d belongs to the cluster c, and
wherein $\Sigma$ is a sum of respective scores of all the pieces of document data d containing the keyword k.

4. The method according to claim 1, further comprising:
receiving a search query;
narrowing down a set of pieces of document data by the search query to create a narrowed set of pieces of document data;
approximating the narrowed set with a linear sum of document clusters; and
inferring, from at least one frequency distribution of a keyword for each document cluster, at least one frequency distribution of the keyword in the narrowed set of pieces of document data.

5. The method according to claim 4, wherein approximating the narrowed set is performed according to an equation:

$$f(\omega)_{q,k} = \sum_c a_c f(\omega)_{c,k}$$

wherein $f(\omega)_{q,k}$ is a frequency coefficient of a time series of frequencies of occurrence of pieces of document data d containing a keyword k in results of a search query q, and
$a_c$ is acquired according to equations 3 and 4 described below:

$$D_q = \sum_c a_c D_c$$

$$a_c = \langle D_q | D_c \rangle$$

where $D_q$ denotes a narrowed set of pieces of document data expressed as a vector in a space in which each piece of document data is set as a dimension,
$D_c$ is a vector in a case where, in the same space, a document cluster is expressed with a component of each dimension being a score of a document corresponding to the dimension in the document cluster, and
$a_c$ is an inner product of $D_q$ and $D_c$.

6. The method according to claim 1, further comprising:
receiving a search query,
narrowing down a set of pieces of document data by the search query to create a narrowed set of pieces of document data;
acquiring, from a time series of a keyword in the narrowed set of pieces of document data a time series of each keyword cluster in the narrowed set of pieces of document data; and
performing a frequency analysis of the time series of the keyword cluster.

7. The method according to claim 6, further comprising:
calculating an index value for each keyword cluster from results of the frequency analysis; and
displaying analysis results based at least in part on the calculated index values.

8. The method according to claim 6, further comprising:
receiving an instruction to perform drill-down to each keyword; and
performing, for a keyword cluster to be subjected to drill-down, a time-series analysis of keywords in descending order of weight in the keyword cluster.

9. The method according to claim 6, wherein acquiring a time series of each keyword cluster further includes:
applying a filter to a data set of pieces of document data.

10. The method according to claim 9, wherein the filter is represented by an equation:

$$\hat{x}(t) = \sum_{i=0}^{n} x(t+i)$$

where $\hat{x}(t)$ is a smoothed time series,
$x(t)$ is an original time series,
i is used to acquire a sum in a range of integers 0 to n,
t is time, and
n is a width of a window for performing convolution.

11. The method according to claim 6, wherein acquiring a time series of each keyword cluster further includes:
removing high frequencies and normalizing an amplitude of a time series according to equations:

$$\langle \hat{x}^2 \rangle = \frac{1}{T} \sum_{t=0}^{T} \hat{x}(t)^2$$

$$\overline{x}(t) = \langle \hat{x}^2 \rangle^{-\frac{1}{2}} \hat{x}(t)$$

where $\langle \hat{x}^2 \rangle$ is a root mean square of a frequency of occurrence,
T is an entire interval of a time series,
$\overline{x}(t)$ a normalized time series of a frequency of occurrence of document data, the time series having been smoothed, and
$\hat{x}(t)$ is a smoothed time series of a frequency of occurrence of document data.

12. The method according to claim 6, wherein acquiring a time series of each keyword cluster includes performing a time-series analysis of a small number of keyword clusters according to an equation:

$$\overline{c}(t) = \sum_x s_c(x) \overline{x}(t)$$

where $\overline{c}(t)$ is a sum regarding all keywords belonging to a cluster in a time series,
$s_c(x)$ is a weight of a keyword x in a cluster c, and
$\overline{x}(t)$ is a normalized time series of a frequency of occurrence of pieces of document data containing each keyword, the time series having been smoothed.

* * * * *